(12) United States Patent
Kobayashi

(10) Patent No.: US 9,318,761 B2
(45) Date of Patent: Apr. 19, 2016

(54) COGENERATION SYSTEM

(75) Inventor: Susumu Kobayashi, Nara (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 551 days.

(21) Appl. No.: 13/821,880

(22) PCT Filed: Sep. 5, 2012

(86) PCT No.: PCT/JP2012/005606
§ 371 (c)(1),
(2), (4) Date: Mar. 8, 2013

(87) PCT Pub. No.: WO2013/035312
PCT Pub. Date: Mar. 14, 2013

(65) Prior Publication Data
US 2013/0273445 A1    Oct. 17, 2013

(30) Foreign Application Priority Data
Sep. 6, 2011 (JP) ................................. 2011-194090

(51) Int. Cl.
| | |
|---|---|
| *F25B 27/02* | (2006.01) |
| *H01M 8/06* | (2006.01) |
| *H01M 8/04* | (2006.01) |
| *H01M 8/12* | (2006.01) |

(52) U.S. Cl.
CPC ............ *H01M 8/0606* (2013.01); *F25B 27/02* (2013.01); *H01M 8/04007* (2013.01);
(Continued)

(58) Field of Classification Search
CPC .................................................. H01M 8/04074
See application file for complete search history.

(56) References Cited

U.S. PATENT DOCUMENTS

| | | | | |
|---|---|---|---|---|
| 6,054,229 A | * | 4/2000 | Hsu ........................... | F24F 5/00 165/48.1 |
| 8,005,510 B2 | | 8/2011 | Fischer | |

(Continued)

FOREIGN PATENT DOCUMENTS

| | | |
|---|---|---|
| JP | 04-126369 A | 4/1992 |
| JP | 2006-073416 A | 3/2006 |

(Continued)

OTHER PUBLICATIONS

Supplementary European Search Report issued in corresponding European Patent Application No. 12829137.4, mailed on Mar. 27, 2015.
(Continued)

*Primary Examiner* — Matthew Merkling
(74) *Attorney, Agent, or Firm* — McDermott Will & Emery LLP

(57) ABSTRACT

A cogeneration system (100) of the present invention comprises a SOFC (13) configured to generate electric power through a power generation reaction by using a fuel gas supplied to the fuel cell and air supplied to the fuel cell; a reformer (16) configured to generate a reformed gas by utilizing power generation reaction heat and combustion heat; a vaporizer (15) configured to generate the steam to be added to the fuel gas supplied to the reformer (16) by utilizing the power generation reaction heat and the combustion heat; an ammonia absorption chiller (10) configured to cool a target by consuming a portion of the power generation reaction heat and a portion of heat of an exhaust gas having the combustion heat which remain after the reformer (16) and the vaporizer (15) have consumed the heat, and cool the exhaust gas by consuming the portion of the heat; and a condensation unit (30) configured to cool the exhaust gas after the ammonia absorption chiller (10) has consumed the portion of the heat owned by the exhaust gas, to condense a moisture contained in the exhaust gas to generate condensed water.

14 Claims, 13 Drawing Sheets

(52) U.S. Cl.
CPC ............. *H01M 8/0618* (2013.01); *H01M 8/12* (2013.01); *H01M 2008/1293* (2013.01); *H01M 2250/10* (2013.01); *Y02B 90/14* (2013.01); *Y02E 60/50* (2013.01); *Y02E 60/525* (2013.01)

(56) References Cited

U.S. PATENT DOCUMENTS

2008/0038600 A1* 2/2008 Valensa ............. H01M 8/04022
 429/423
2008/0118800 A1 5/2008 Devriendt et al.

FOREIGN PATENT DOCUMENTS

| | | |
|---|---|---|
| JP | 2008-293749 A | 12/2008 |
| JP | 2009-168348 A | 7/2009 |
| JP | 2010-218691 A | 9/2010 |
| WO | 2010/123146 A1 | 10/2010 |

OTHER PUBLICATIONS

International Search Report issued in International Patent Application No. PCT/JP2012/005606 dated Oct. 2, 2012.

* cited by examiner

COGENERATION SYSTEM

RELATED APPLICATIONS

This application is the U.S. National Phase under 35 U.S.C. §371 of International Application No. PCT/JP2012/005606, filed on Sep. 5, 2012, which in turn claims the benefit of Japanese Application No. 2011-194090, filed on Sep. 6, 2011, the disclosures of which Applications are incorporated by reference herein.

TECHNICAL FIELD

The present invention relates to a cogeneration system which uses a solid oxide fuel cell (SOFC) as a base power supply.

BACKGROUND ART

To support popularization of mobile communication in developing countries, it is necessary to put in infrastructure in place in a base station, or the like. However, in most districts of the developing countries, utility power infrastructures have not been put in place yet, and therefore, it is difficult to supply electric power stably to the base station. Under the circumstances, in provision of the base station in the developing countries, development of a self-sustainable power supply in the base station, improvement a fuel efficiency of the self-sustainable power supply, easiness of maintenance of the self-sustainable power supply, and the like are important aims to be attained.

Accordingly, in recent years, the use of a fuel cell as a backup power supply in the base station has been practiced. For example, as the system using the fuel cell as the backup power supply, there is US T-Mobile, etc. (see Patent Literature 1). As this system, a backup system using PEFC (polymer electrolyte fuel cell) is disclosed.

Another fuel cell system is disclosed, which includes a SOFC unit and an absorption chiller, and is configured such that the absorption chiller is actuated by heating a reproduction device of the absorption chiller by a combustion exhaust gas discharged from the SOFC unit (Patent Literature 2).

CITATION LISTS

Patent Literature

Patent Literature 1: U.S. Pat. No. 8,005,510 Specification
Patent Literature 2: Japanese Laid-Open Patent Application Publication No. 2006-73416

SUMMARY OF THE INVENTION

Technical Problem

However, in the above stated prior arts, in the system which practices cogeneration in which an energy efficiency is improved by actuating the absorption chiller by an exhaust gas generated during power generation in the fuel cell, there is a problem that water of an amount required for the power generation in the fuel cell cannot be recovered within the system.

More specifically, the fuel cell system disclosed in Patent Literature 1 is the PEFC (polymer electrolyte fuel cell). An operation temperature of the PEFC is low (60 to 80 degrees C.), and a refrigeration cycle of the absorption chiller cannot be actuated by the exhaust gas (combustion exhaust gas) discharged. In other words, the fuel cell system disclosed in Patent Literature 1 is incapable of implementing cogeneration which improves the energy efficiency such that the absorption chiller can be actuated by utilizing the exhaust gas.

The fuel cell system disclosed in Patent Literature 2 is configured such that a heat exchanger exchanges heat between the exhaust gas and the water to recover a moisture from the exhaust gas containing it as steam. However, the combustion exhaust gas still has high-temperature heat after the absorption chiller is actuated by heating the reproduction device of the absorption chiller using the heat of the exhaust gas. Even after the heat exchanger exchanges heat between the exhaust gas and the water after the absorption chiller is actuated by utilizing the heat, the resulting temperature of the exhaust gas is about 100 degrees C. at maximum (see [0054] in Patent Literature 2).

To recover the water of an amount required to actuate the fuel cell system from the exhaust gas, it is necessary to lower the temperature of the exhaust gas to about 40 degrees C., as will be described in detail later. That is, in the configuration of the fuel cell system disclosed in Patent Literature 2, the temperature of the exhaust gas cannot be lowered sufficiently to a temperature at which the water of an amount required to actuate the fuel cell system can be recovered from the exhaust gas.

The heat exchanger in the fuel cell system disclosed in Patent Literature 2 is configured to exchange heat between the exhaust gas and water supplied as tap water, and the like. In a case where a fuel cell system is provided in an environment in which water cannot be supplied from outside as described above, the heat exchanger disclosed in Patent Literature 2 cannot be used.

In the fuel cell system disclosed in Patent Literature 2, therefore, the water cannot be supplied in a self-sustainable manner within the system. This fuel cell system cannot be utilized in a region where no water source is attained.

The present invention has been developed in view of the above stated problems, and an object of the present invention is to provide a cogeneration system which is capable of supplying water in a self-sustainable manner within the system.

Solution to Problem

To achieve the above described objective, according to the present invention, a cogeneration system comprises a high-temperature operative fuel cell configured to generate electric power through a power generation reaction by using a fuel supplied to the fuel cell and air supplied to the fuel cell; a reformer configured to generate a reformed gas which becomes the fuel, through a reforming reaction between a raw material gas supplied to the reformer and a steam supplied to the reformer, by utilizing power generation reaction heat generated in the high-temperature operative fuel cell and combustion heat of unconsumed fuel; a vaporizer configured to generate the steam to be added to the raw material gas supplied to the reformer by utilizing the power generation reaction heat and the combustion heat; a cooling apparatus configured to cool a target by consuming a portion of the power generation reaction heat and a portion of heat of an exhaust gas having the combustion heat which remain after the reformer and the vaporizer have consumed the heat, and cool the exhaust gas by consuming a portion of the heat; and a condensation unit configured to cool the exhaust gas after the cooling apparatus has consumed the portion of the heat owned by the exhaust gas to condense a moisture contained in the exhaust gas to generate condensed water.

Therefore, the cogeneration system of the present invention can achieve an advantage that water can be supplied in a self-sustainable manner within the system.

Advantageous Effects of the Invention

Therefore, the cogeneration system of the present invention is configured as described above, and can achieve an advantage that water can be supplied in a self-sustainable manner within the system.

DESCRIPTION OF EMBODIMENTS (Finding which is the Basis of the Invention)

Figure 13:
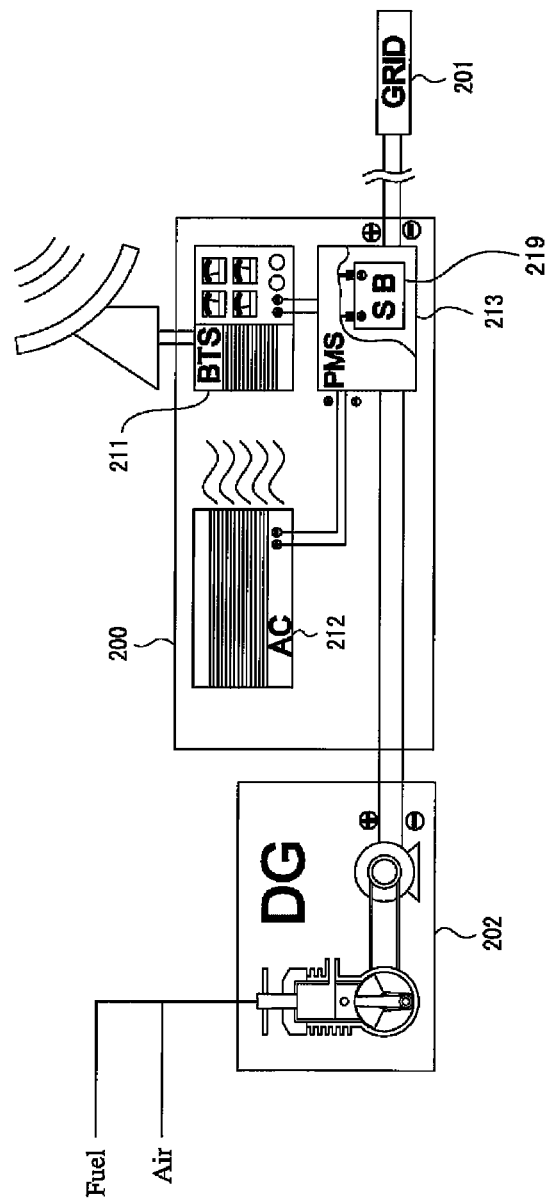
FIG. 13 is a schematic view showing an exemplary configuration of a present (current) base station.

As shown in FIG. 13, generally, a present (current) base station includes a base station shelter 200, a utility power supply (GRID) 201, and a diesel generating apparatus (DG) 202, and electric power is supplied to the base station shelter 200 from both of the GRID 201 and the DG 202. FIG. 13 is a schematic view showing an exemplary configuration of a present (current) base station.

The base station shelter 200 includes therein BTS (base transceiver system: communication device) 211, an air conditioner (AC) 212, and a power management system (PMS) 213 including a storage battery (SB) 219 for backup.

The PMS 213 converts the electric power (e.g., AC 220V) from the DG 202 and the GRID 201 into electric power (e.g., DC 48V) for actuating the BTS 211, and supplies the DC power to the BTS 211. In addition, the PMS 213 manages power for continuous electric power consumption in the BTS 211, for example, backup performed by SB 219 until the DG 202 is activated in a state in which the electric power is not supplied from the GRID 201 to the BTS 211.

The AC 212 adjusts a room temperature so that a temperature in an interior of the base station shelter 200 does not exceed an operating temperature of the BTS 211. Specifically, the AC 212 adjusts the room temperature so that the temperature in the interior of the base station shelter 200 becomes about 35 degrees C.

The electric power consumption in the base station in the present situation will now be discussed. It is known that the base station is a facility which is lower in energy efficiency than another facilities on the basis of an index of PUE (power usage efficiency). The PUE is an index indicating energy efficiency of a data center, a communication base station, etc., and is derived by dividing total energy consumption by energy consumption in IT devices such as server. For example, the data center or the like consumes 2000 KW to cause the IT devices to operate at 1000 KW, and PUE is 2.0. By comparison, in the base station, the RUE is equal to or greater than 5 in terms of this index. Thus, the base station is lower in energy efficiency.

As a cause for lowering the energy efficiency in the base station as described above, there is a need for cooling equipment such as the AC 212. An ambient temperature at which the BTS 211 is operative in the interior of the base station shelter 200 is, as described above, equal to or less than about 35 degrees C. This is because, a power element (power-MOSFET, or the like: member to be cooled) incorporated into a power amplifier section in the BTS 211 may possibly be damaged by heat if the temperature exceeds 35 degrees C. Because of this, it is necessary to always control the temperature in the interior of the base station shelter 200 to 35 degrees C. or less by using the AC 212.

In the base station, the electric power consumption in the BTS 211 itself is 1 KW or less at maximum, while the electric power consumption in the AC 212 for performing cooling to actuate the BTS 211 is about 4 KW at maximum. That is, in the base station, an amount of electric power consumed in the AC 212 for controlling the room temperature to enable the BTS 211 to operate is greater than an amount of electric power consumed by the operation of the BTS 211. For this reason, the amount of electric power consumption in the base station depends on an outside air temperature which directly affects the room temperature in the interior of the base station shelter 200, rather than required electric power in the BTS 211.

In a configuration of, for example, the base station, in which the BTS continuously consumes electric power and cooling heat consumption for temperature control for the power element, etc., is necessary, cogeneration is efficiently used, which uses an absorption chiller actuated by exhaust heat resulting from power generation. However, the diesel engine (DE), a gasoline engine (GE), a micro gas turbine (MGT), and the like, which are used as distributed power supply engines, as in the base station in the present situation, etc., cannot become efficient cogeneration engines which supply electric power to small-scale power consumption equipment. That is, an exhaust heat temperature of at least about 200 degrees C. is required to actuate the absorption chiller. Regarding DE and GE, cooling water waste heat which occupies a most part of waste heat has a temperature of about 90 degrees C., and is lower than the temperature required to actuate the absorption chiller. In contrast, the MGT is able to attain exhaust heat of a heat amount sufficient to actuate the absorption chiller, because its exhaust heat temperature is about 250 degrees C. However, the MGT typically generates electric power with 100 KW or greater, in factories, or the like. It is difficult to reduce a size of the MGT adaptively for generation of electric power with about several KW or less which is necessary in the base station.

In addition, the electric power consumption in the base station depends on the outside air temperature surrounding the base station shelter 200 as described above. Because of this, a required cooling heat amount in the base station fluctuates depending on season or time in one day. That is, a demand ratio between electricity and heat (electricity-heat ratio) is varied depending on time or season. It is difficult to apply the conventional cogeneration in which a constant electricity-heat ratio is assumed.

In view of the above, a fuel cell having the following advantages is used as the backup power supply for the base station. The fuel cell has advantages that its power generation efficiency does not depend on a scale of electric power consumption facility, unlike heat engines such as the above stated DE, GE or MGT, and the fuel cell is able to supply electric power such that it flexibly addresses electric power consumption fluctuating significantly. In addition, the fuel cell has advantages that it is able to continue to generate desired electric power without stopping power generation due to changes in natural environment, etc., unlike natural energy such as solar light power generation.

In order to implement cogeneration with improved energy efficiency in which the absorption chiller is actuated by utilizing the exhaust gas, a high-temperature operative fuel cell such as a solid oxide fuel cell (SOFC) or a molten carbonate fuel cell (MCFC) is suitably used.

Based of the above stated findings, the present invention provides the following aspects.

According to a first aspect of the present invention, a cogeneration system comprises a high-temperature operative fuel cell configured to generate electric power through a power generation reaction by using a fuel supplied to the fuel cell and air supplied to the fuel cell; a reformer configured to generate a reformed gas which becomes the fuel, through a reforming reaction between a raw material gas supplied to the reformer and a steam supplied to the reformer, by utilizing power generation reaction heat generated in the high-temperature operative fuel cell and combustion heat of unconsumed fuel; a vaporizer configured to generate the steam to be added to the raw material gas supplied to the reformer by utilizing the power generation reaction heat and the combustion heat; a cooling apparatus configured to cool a target by consuming a portion of the power generation reaction heat and a portion of heat of an exhaust gas having the combustion heat which remain after the reformer and the vaporizer have consumed the heat, and cool the exhaust gas by consuming the portion of the heat; and a condensation unit configured to cool the exhaust gas after the cooling apparatus has consumed the portion of the heat owned by the exhaust gas to condense a moisture contained in the exhaust gas to generate condensed water.

The term "high-temperature operative fuel cell" refers to a fuel cell which is operative at a temperature of 400 degrees C. or higher. As the high-temperature operative fuel cell, there are, for example, a solid oxide fuel cell (SOFC), a molten carbonate fuel cell (MCFC), and the like.

In accordance with the above described configuration, since the cogeneration system includes the vaporizer, the reformer, and the high-temperature operative fuel cell, the electric power is generated in power generation using the supplied air and the reformed gas (fuel) generated from the raw material gas, and the electric power is provided. The cooling apparatus is able to suitably cool the target such as components, substances, or spaces which require cooling. That is, it is possible to practice the cogeneration with improved energy efficiency, in which the cooling apparatus is actuated by consuming a portion of the heat owned by the exhaust gas generated during the power generation in the high-temperature operative fuel cell. Furthermore, the exhaust gas can be cooled by consuming a portion of the heat owned by the exhaust gas when the cooling apparatus is actuated.

The condensation unit is able to cool the exhaust gas after the cooling apparatus has cooled the exhaust gas by consuming a portion of the heat owned by the exhaust gas to condense the moisture contained in the exhaust gas to generate the condensed water. Thus, in the cogeneration system according to the first aspect of the present invention, the water required during the power generation in the high-temperature operative fuel cell can be covered by recovering the moisture generated within the system.

Therefore, the cogeneration system according to the first aspect of the present invention is able to achieve an advantage that the water can be supplied in a self-sustaining manner within the system.

According to a second aspect of the present invention, in the cogeneratin system according to the first aspect, the condensation unit may include a first heat exchanger configured to heat the raw material gas to be supplied to the vaporizer by utilizing heat of the exhaust gas after the cooling apparatus has consumed the portion of the heat; and a second heat exchanger configured to heat the air to be supplied to the high-temperature operative fuel cell by utilizing the heat of the exhaust gas after the first heat exchanger has utilized the heat and to condense the moisture contained in the exhaust gas to generate the condensed water.

In accordance with the above described configuration, since the condensation unit includes the first heat exchanger and the second heat exchanger, the raw material gas and the air can be heated by utilizing the heat owned by the exhaust gas.

Thus, the heated air can be supplied to the high-temperature operative fuel cell and the heated raw material gas can be supplied to the vaporizer. Therefore, a heat energy required to raise the temperature of the air and a heat energy required when the water is added to the raw material gas can be suppressed, and as a result, the temperature of the heat owned by the exhaust gas can be raised. Thereby, energy (exergy) which can be taken out of the exhaust gas can be increased.

The cooler performs the cooling, the first heat exchanger heats the raw material gas, and the second heat exchanger heats the air, by utilizing the heat owned by the exhaust gas. In this way, the heat owned by the exhaust gas can be consumed, and finally, the temperature of the exhaust gas can be lowered to a temperature (e.g., about 40 degrees C.) at which the water with an amount required for the power generation in the high-temperature operative fuel cell is attained. Thus, the cogeneration system according to the second aspect of the present invention is able to cover the water required for the power generation in the high-temperature operative fuel cell by recovering the water generated within the system.

According to a third aspect of the present invention, in the cogeneratin system according to the second aspect, the first heat exchanger may be a total enthalpy heat exchanger which heats the raw material gas to be supplied to the vaporizer by utilizing the heat of the exhaust gas after the cooling apparatus has consumed a portion of the heat and humidifies the raw material gas by the moisture contained in the exhaust gas.

When the first heat exchanger is the total enthalpy heat exchanger, the raw material gas can be heated and humidified by utilizing the heat owned by the exhaust gas.

Because of the above, the raw material gas heated and humidified can be supplied to the vaporizer. Therefore, a heat energy required when the water is added to the raw material gas can be suppressed, and as a result, the temperature of the heat owned by the exhaust gas can be raised. Thereby, energy (exergy) which can be taken out of the exhaust gas can be increased.

According to a fourth aspect of the present invention, in the cogeneratin system according to the first aspect, the condensation unit may include a blower for air-cooling the exhaust gas after the cooling apparatus has consumed a portion of the heat; and the blower may cool the exhaust gas to condensate the moisture contained in the exhaust gas to generate the condensed water.

In accordance with this configuration, the blower is able to lower the temperature of the exhaust gas to a temperature (e.g., about 40 degrees C.) at which the water of an amount required for the power generation in the high-temperature operative fuel cell is attained.

Thus, the cogeneration system of the present invention is able to cover the water required during the power generation in the high-temperature operative fuel cell by recovering the moisture generated within the system.

According to a fifth aspect of the present invention, in the cogeneratin system according to any one of the first to fourth aspects, the vaporizer may be configured to vaporize the condensed water by utilizing the power generation reaction heat and the combustion heat to generate the steam.

According to a sixth aspect of the present invention, in the cogeneratin system according to any one of the first to fifth aspects, the cooling apparatus may be an absorption cooling apparatus which causes a cooling medium to be absorbed into an absorbing liquid and circulates the absorbing liquid; the cooling medium may have a lower boiling temperature than the absorbing liquid; and the cogeneration system may comprise a third heat exchanger configured to exchange heat between the exhaust gas and the absorbing liquid containing the cooling medium to separate the cooling medium from the absorbing liquid containing the cooling medium; and the absorbing liquid containing the cooling medium may be vaporized by heat attained by the heat exchange performed by the third heat exchanger.

According to a seventh aspect of the present invention, in the cogeneratin system according to the sixth aspect, the absorption cooling apparatus may include: a rectification device configured to liquefy only the absorbing liquid from the absorbing liquid having been vaporized and containing the cooling medium, to separate the absorbing liquid from the cooling medium; and a fourth heat exchanger configured to exchange heat between vaporized cooling medium which has been separated from the absorbing liquid by the rectification device and the air to be supplied to the high-temperature operative fuel cell to liquefy the vaporized cooling medium; the air heated by the heat exchange with the vaporized cooling medium which is performed by the fourth heat exchanger may be supplied to the high-temperature operative fuel cell.

In accordance with this configuration, since the absorption cooling apparatus includes the fourth heat exchanger, it cools and liquefies the cooling medium vaporized in the absorption cooling apparatus, and preliminarily heats the air supplied to the high-temperature operative fuel cell.

Therefore, the absorption chiller can be operated stably, and the temperature of the exhaust gas discharged from the high-temperature operative fuel cell can be improved. Thereby, energy (exergy) which can be taken out of the exhaust gas can be increased.

According to an eighth aspect of the present invention, the cogeneratin system according to the third aspect may further comprise a water transporting unit configured to transport the condensed water generated from the exhaust gas by the second heat exchanger, to the first heat exchanger; and the condensed water transported by the water transporting unit may be mixed with the exhaust gas to generate the exhaust gas containing the condensed water as the steam; and the first heat exchanger may cause the steam contained in the exhaust gas to be transferred to the raw material gas to heat and humidify the raw material gas.

In accordance with this configuration, the water transporting unit is able to transport the condensed water generated from the exhaust gas to the first heat exchanger. The condensed water transported to the first heat exchanger is vaporized by the high-temperature exhaust gas, and flows through the first heat exchange in a state in which the steam is contained in the exhaust gas. That is, the exhaust gas containing plenty of steam can heat and humidify the raw material gas in the first heat exchanger. This enables the first heat exchanger to efficiently humidify the raw material gas supplied to the high-temperature operative fuel cell.

According to a ninth aspect of the present invention, the cogeneratin system according to the eighth aspect, may further comprise a reduction reaction section configured to reduce a sulfur compound contained in the raw material gas from a mixture gas containing a portion of the reformed gas generated by the reformer and the raw material gas, to generate hydrogen sulfide; and an adsorption section which adsorbs and removes the hydrogen sulfide generated by the reduction reaction section; and the reduction reaction section may be supplied with the exhaust gas to be supplied to the cooling apparatus, and a reaction temperature in the reduction reaction section is maintained by the heat transferred from the exhaust gas.

According to a tenth aspect of the present invention, the cogeneratin system according to any one of the first to ninth aspects, may further comprise a storage device configured to store the electric power generated in the high-temperature operative fuel cell.

According to an eleventh aspect of the present invention, the cogeneratin system according to any one of the first to tenth aspects, the cooling apparatus may cool at least a component which requires cooling as the target, in equipment actuated by the electric power generated in the high-temperature operative fuel cell.

In accordance with this configuration, the equipment can be actuated by the electric power generated in the high-temperature operative fuel cell, and the cooling apparatus can be actuated by the exhaust gas generated during the power generation in the high-temperature operative fuel cell, to cool the component which requires cooling in the equipment. Therefore, it is possible to practice the cogeneration with improved energy efficiency, in which the cooler is actuated by the exhaust gas generated during the power generation in the high-temperature operative fuel cell.

According to a twelfth aspect of the present invention, in the cogeneratin system according to the eleventh aspect, an upper limit value of a temperature to which the component which requires cooling is cooled may be predetermined; and the cooling apparatus may cool the component which requires cooling to a temperature lower than the predetermined upper limit value.

According to a thirteenth aspect of the present invention, in the cogeneratin system according to the eleventh or twelfth aspect, an amount of power generation in the high-temperature operative fuel cell may be controlled based on temperature information of the component which requires cooling.

In accordance with this configuration, the amount of power generation in the high-temperature operative fuel cell can be controlled based on temperature information of the component which requires cooling. For example, the operation and the amount of power generation in the high-temperature operative fuel cell can be controlled according to a demand of heat so that the temperature of the component which requires cooling is kept at a temperature which is equal to or lower than a particular temperature. Since the operation and the amount of power generation in the high-temperature operative fuel cell can be controlled by simple control in a heat-superior and power-subordinate relationship, reliability of the system can be improved.

According to a fourteenth aspect of the present invention, in the cogeneratin system according to one of the first to tenth aspects, the cooling apparatus may cool the exhaust gas having been cooled by the condensation unit, as the target, to condense the moisture contained in the exhaust gas to generate the condensed water.

In accordance with this configuration, the cooling apparatus is able to cool the exhaust gas having been cooled by the condensation unit. The moisture contained in the exhaust gas can be condensed to generate the condensed water. Thus, the cogeneration system is able to increase an amount of generation of the condensed water from the exhaust gas.

Embodiment 1

Hereinafter, preferred embodiment (Embodiment 1) of the present invention will be described with reference to the drawings. Hereinafter, throughout the drawings, the same or corresponding components are identified by the same reference symbols, and will not be described in repetition.

(Cogeneration System)

Figure 1:
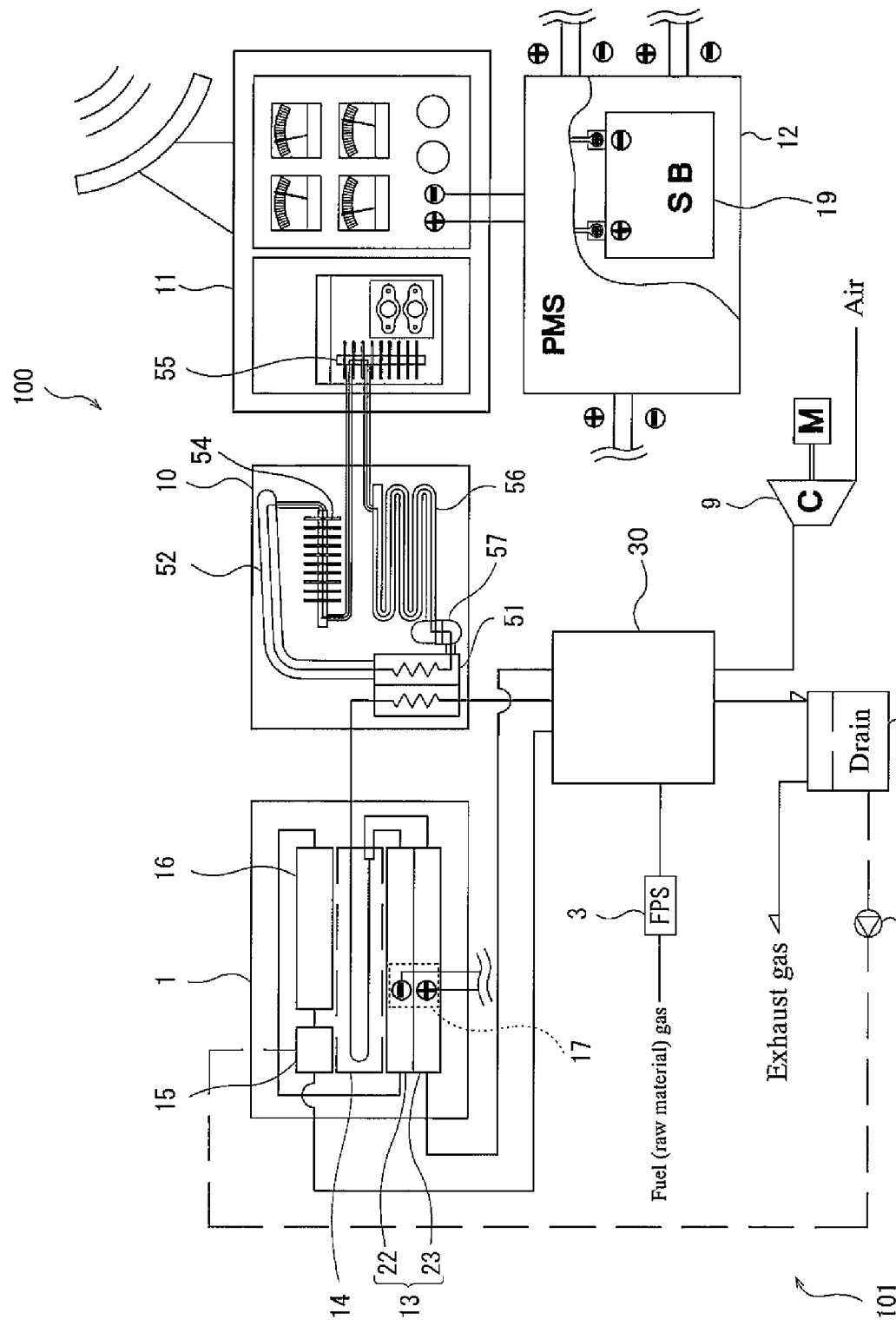
FIG. 1 is a schematic view showing an exemplary configuration of a cogeneration system in a base station according to Embodiment 1.

Now, a description will be given of an example of a cogeneration system 100 implemented in the base station according to the present embodiment (Embodiment 1) with reference to FIG. 1. FIG. 1 is a schematic view showing an exemplary configuration of the cogeneration system 100 in the base station according to Embodiment 1.

The cogeneration system 100 according to Embodiment 1 mainly comprises a SOFC system (high-temperature operative fuel cell system) 101 which serves as a power generating apparatus, a BTS (equipment) 11 within the base station shelter which utilizes the electric power generated in the SOFC system 101, and an ammonia absorption chiller (cooling apparatus, absorption cooling apparatus) for cooling a power element of a power amplifier section in the BTS 11.

Further, the cogeneration system 100 comprises a power management system (PMS) 12 including a storage battery (SB 19) for backup and a diesel engine (DG) (not shown) as an auxiliary power supply. The BTS 11 is supplied with the electric power from the SOFC system 101. The BTS 11 is configured to be supplied with electric power from the SB 19 or from the DG via the PMS 12 when electric power is not supplied from the SOFC system 101 to the BTS 11 or the electric power from the SOFC system 101 is deficient.

That is, in the present embodiment, the base station is located in a region where GID is not installed yet, and is configured such that the SOFC system 101 supplies the electric power to the BTS 11 instead of supplying the electric power from the GRID to the BTS 11. Also, the base station is located in a region where a water source such as water for industrial use is not obtained, and is configured such that the SOFC system 101 recovers water from the exhaust gas and supplies the water to a vaporizer 15 in a SOFC hot module 1 to be used for actuating the SOFC hot module 1.

The ammonia absorption chiller 10 is configured such that a regenerative heat exchanger (third heat exchanger) 51 is heated by heat of the exhaust gas discharged from the SOFC hot module 1 in the SOFC system 101, and an ammonia water solution is vaporized by the heated regenerative heat exchanger 51 as a heat source, although its detail will be described later.

As described above, the cogeneration system 100 according to Embodiment 1 comprises the ammonia absorption chiller 10 as a heat load, the BTS 11 as a power load and the SOFC system 101 as the power generating apparatus. Power generation control in a SOFC cell (high-temperature operative fuel cell) 13 in the SOFC system 101 is performed according to the electric power consumption relating to communication in the base station.

(Configuration of SOFC System)

The SOFC system 101 included in the cogeneration system 100 according to Embodiment 1 will now be described. The SOFC system 101 is a power generation system utilizing a SOFC (solid oxide fuel cell) as the fuel cell. As shown in FIG. 1, the SOFC system 101 includes the SOFC hot module 1, a drain tank 2, a fuel processor system (FPS) 3, a condensation unit 30, a blower 9, and a first condensed water pump 20.

The SOFC hot module 1 serves as a power generation apparatus in the cogeneration system 100, and includes a SOFC cell 13 containing an anode 22 and a cathode 23 therein, a combustion section 14, a vaporizer 15 and a reformer 16.

The SOFC cell 13 is a power generating section, and is provided with a current collecting member 17. Although not shown in FIG. 1, the SOFC cell 13 is electrically connected to the BTS 11 as the power load via the current collecting member 17 and a power converter (not shown).

The reformer 16 is configured to perform steam-reforming of a fuel (raw material) gas such as a city gas. The vaporizer 15 vaporizes water used for the steam-reforming, add steam to a fuel gas, and supplies the resulting fuel gas to the reformer 16. The combustion section 14 is provided between the SOFC cell 13 and, the reformer 16 and the vaporizer 15. Heat generated in the combustion section 14 covers reforming reaction heat (reforming reaction energy) required in the reformer 16 and vaporization heat (water vaporization energy) required in the vaporizer 15.

In the SOFC system 101, a regenerative heat exchanger 51 of the ammonia absorption chiller 10 is configured to exchange heat between the exhaust gas discharged from the SOFC hot module 1 and a cooling medium (ammonia). Specifically, the ammonia absorption chiller 10 cools a target (power element of the power amplifier section in the BTS 11) by consuming a portion of the heat owned by the exhaust gas, and cools the exhaust gas discharged from the SOFC hot module 1 by consuming the portion of the heat Thereafter, the SOFC system 101 further cools the exhaust gas after the heat has been consumed by the above stated heat exchange, to condense the moisture from the exhaust gas. More specifically, in the SOFC system 101 of Embodiment 1, the condensation unit 30 causes the exhaust gas after the heat has been consumed by the above stated heat exchange, to radiate heat and lower its temperature to a level at which the moisture can be condensed from the exhaust gas. Thus, in the SOFC system 101, the water can be recovered from the exhaust gas.

Hereinafter, the condensation unit 30 in the SOFC system 101 according to Embodiment 1 will be described more specifically.

(Condensation Unit)

Figure 2:
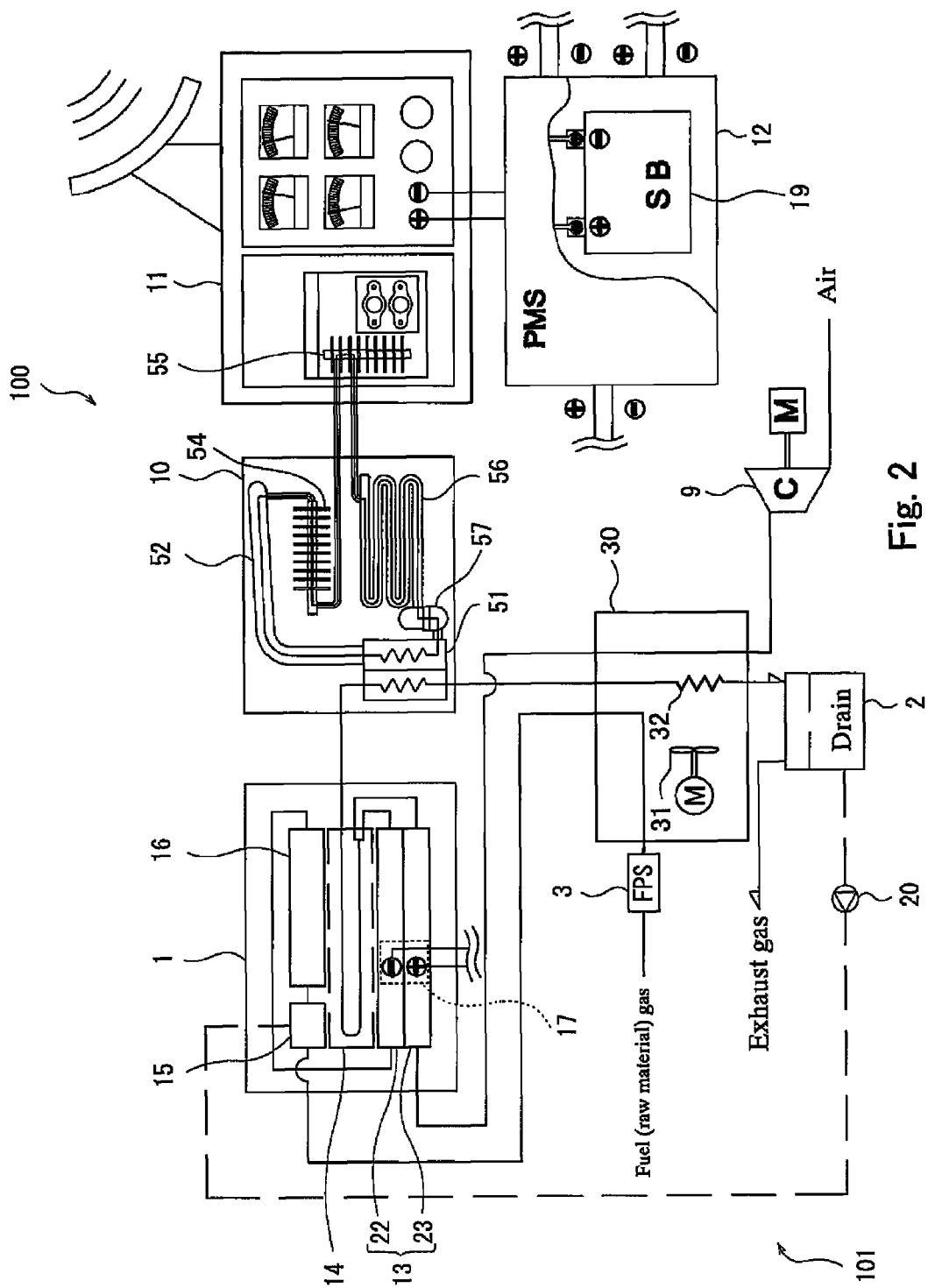
FIG. 2 is a schematic view showing an exemplary configuration of the cogeneration system in the base station according to Embodiment 1.

An exemplary configuration of the condensation unit 30 in the SOFC system 101 will be described with reference to FIG. 2. FIG. 2 is a schematic view showing an exemplary configuration of the cogeneration system 100 in the base station according to Embodiment 1.

As shown in FIG. 2, the condensation unit 30 includes a blower fan (blower) 31 actuated by a motor and a radiator 32 through which the exhaust gas flows, to radiate heat from the exhaust gas so that its temperature is lowered to a level at which the moisture can be condensed from the exhaust gas. The blower fan 31 air-cools the exhaust gas flowing through the radiator 32.

Since the condensation unit 30 is configured as described above, the temperature of the exhaust gas can be lowered to a level at which the moisture can be condensed from the exhaust gas. Thus, the water can be recovered from the exhaust gas.

Figure 3:
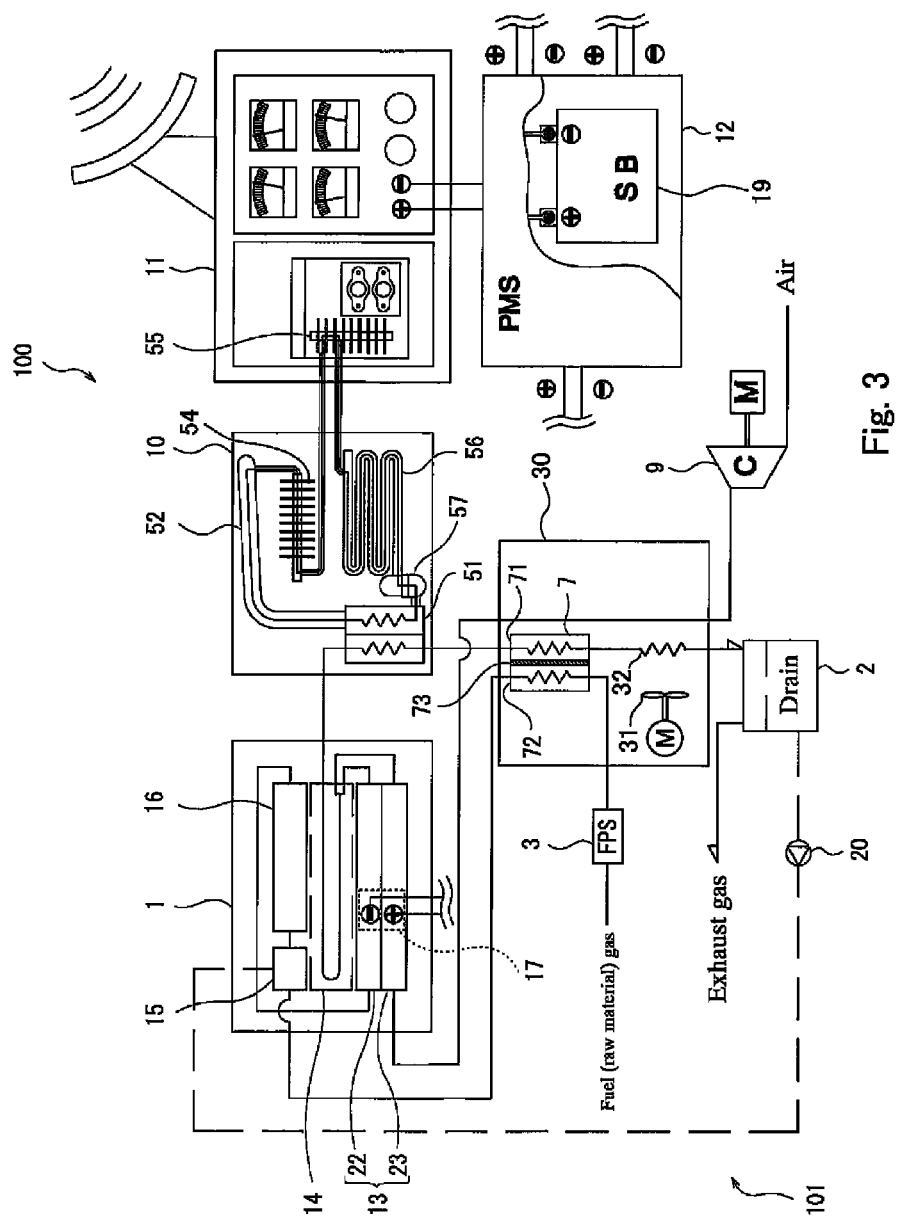
FIG. 3 is a schematic view showing an exemplary configuration of the cogeneration system in the base station according to Embodiment 1.

The condensation unit 30 may be configured in such a manner that a heat exchanger exchanges heat between the supplied fuel (raw material) gas and the exhaust gas to lower the temperature of the exhaust gas more efficiently as well as cooling of the exhaust gas by the blower fan 31. Specifically, as shown in FIG. 3, the condensation unit 30 further includes a total enthalpy heat exchanger 7 as a heat exchanger for exchanging heat between the fuel (raw material) gas and the exhaust gas. FIG. 3 is a schematic view showing an exemplary configuration of the cogeneration system 100 in the base station according to Embodiment 1.

The exhaust gas having gone through the heat exchange in the regenerative heat exchanger 51 of the ammonia absorption chiller 10 flows into the total enthalpy heat exchanger 7, while the fuel (raw material) gas supplied to the SOFC hot module 1 also flows into the total enthalpy heat exchanger 7. In the total enthalpy heat exchanger 7, total enthalpy heat exchange occurs between the exhaust gas and the fuel (raw material) gas. In the SOFC system 101, the blower fan 31 cools the exhaust gas having gone through the total enthalpy heat exchange, thereby recovering the water from the exhaust gas.

As defined herein, the heat exchange means that only heat is exchanged without migration of substances, while the total enthalpy heat exchange means that heat exchange occurs while the substances are migrating.

As described above, in the condensation unit 30, the total enthalpy heat exchanger 7 performs the total enthalpy heat exchange between the exhaust gas and the fuel (raw material) gas and the blower fan 31 cools the exhaust gas, thereby lowering the exhaust gas efficiently.

In the total enthalpy heat exchanger 7, the heat owned by the exhaust gas and the moisture contained in the exhaust gas are transferred to the fuel (raw material) gas, and thereby the fuel (raw material) gas is heated and humidified. Since the fuel (raw material) gas can be heated preliminarily, the temperature of the exhaust gas discharged from the SOFC hot module 1 can be raised. In addition, since the fuel (raw material) gas can be humidified, the amount of reforming water supplied to the reformer 16 can be reduced.

Figure 4:
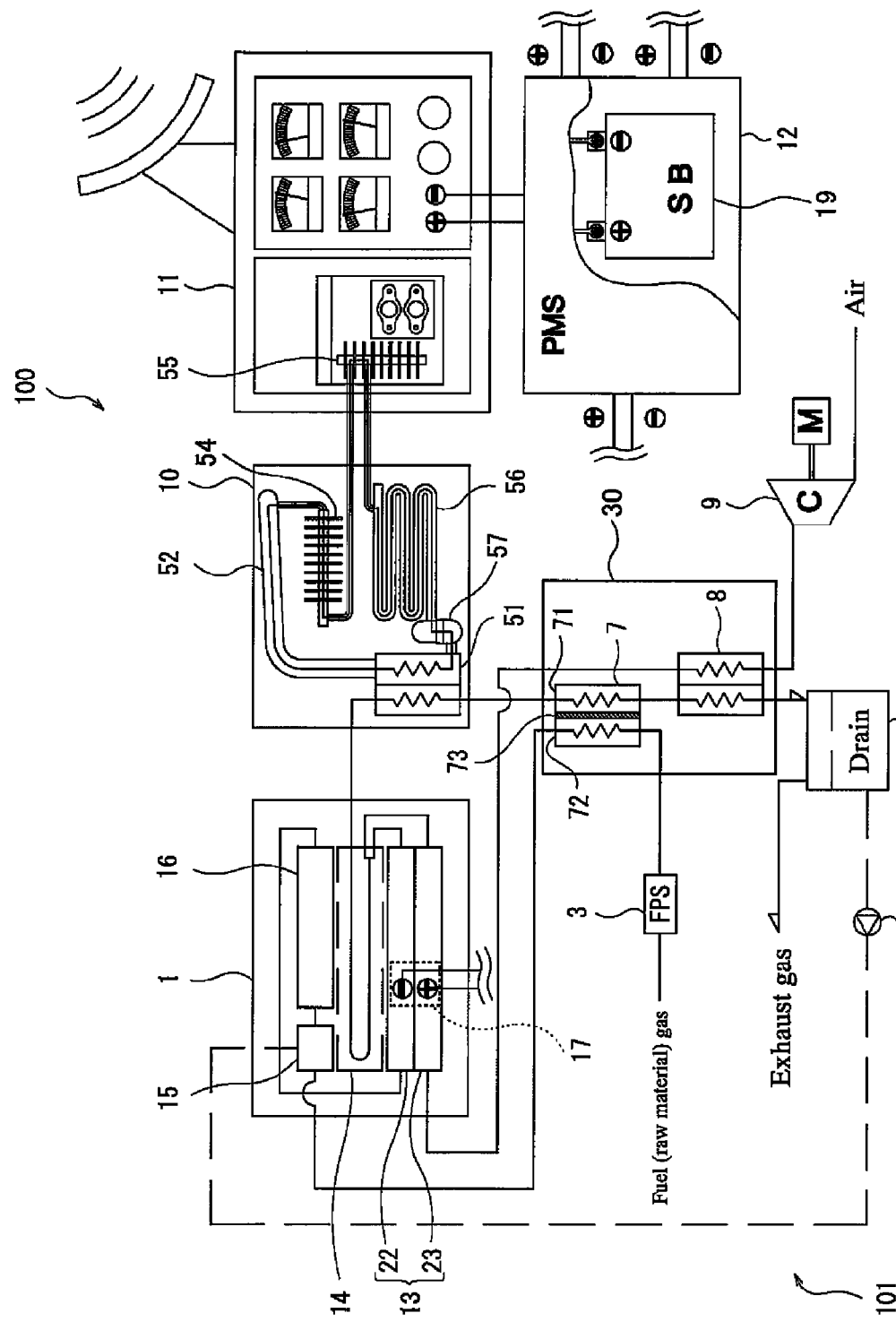
FIG. 4 is a schematic view showing an exemplary configuration of the cogeneration system in the base station according to Embodiment 1.

To raise the temperature of the exhaust gas discharged from the SOFC hot module 1, as shown in FIG. 4, the condensation unit 30 may include a condensation heat exchanger 8 instead of the blower fan 31 in the configuration of FIG. 3. FIG. 4 is a schematic view showing an exemplary configuration of the cogeneration system 100 in the base station according to Embodiment 1.

In the condensation unit 30, the total enthalpy heat exchanger 7 performs total enthalpy heat exchange between the fuel (raw material) gas and the exhaust gas. Then, the condensation heat exchanger 8 exchanges heat between the exhaust gas having gone through the total enthalpy heat exchange and the air supplied to the SOFC hot module 1.

In the SOFC system 101 configured as described above, the temperature of the exhaust gas can be lowered to a level at which the moisture can be condensed from the exhaust gas in the cogeneration system 100. Thus, the water can be recovered from the exhaust gas. Further, since the fuel (raw material) gas and the air can be supplied to the SOFC hot module 1 after they are heated preliminarily, the temperature of the exhaust gas discharged from the SOFC hot module 1 can be raised.

As shown in FIG. 4, the total enthalpy heat exchanger 7 includes a fuel passage section 72 through which the fuel (raw material) gas flows and a heating section 71 through which the exhaust gas flows. The heating section 71 and the fuel passage section 72 are separated from each other by a selective permeable membrane 73 which allows selective permeation of a moisture. The total enthalpy heat exchanger 7 performs total enthalpy heat exchange between the steam contained in the exhaust gas flowing through the heating section 71 and the fuel gas flowing through the fuel passage section 72 (performs heat exchange while the substances are migrating) via the selective permeable membrane 73. In this way, the fuel (raw material) gas is heated and humidified.

As described above, the condensation unit 30 includes the total enthalpy heat exchanger 7 which performs total enthalpy heat exchange between the exhaust gas and the fuel (raw material) gas. However, it is sufficient that the heat is transferred from the exhaust gas to the fuel (raw material) gas, in order to lower the temperature of the exhaust gas to generate condensed water. Therefore, instead of the total enthalpy heat exchanger 7, a heat exchanger which exchanges heat between the exhaust gas and the fuel (raw material) may be used. Nonetheless, the total enthalpy heat exchanger 7 is suitably used, because it is able to heat and humidify the fuel (raw material) gas.

(Explanation of Operation of SOFC System)

Next, by way of example, a basic operation of the SOFC system 101 having the configuration of FIG. 4 will be described.

The SOFC hot module 1 is supplied with the fuel (raw material) gas and the air. Before the fuel (raw material) gas is supplied to the SOFC hot module 1, the fuel processor system (FPS) 3 removes impurities from the fuel (raw material) gas. Then, the total enthalpy heat exchanger 7 heats and humidifies the fuel (raw material) gas by the total enthalpy heat exchange with the exhaust gas discharged from the SOFC hot module 1, and thereafter supplies the fuel (raw material) gas to the SOFC hot module 1.

The fuel (raw material) gas supplied to the SOFC hot module 1 is sent out to the vaporizer 15. The vaporizer 15 adds the vaporized water to the fuel (raw material) gas, and supplies a mixture gas of the fuel (raw material) gas and the steam, to the reformer 16.

During running of the SOFC system 101, air discharged from the cathode 23 and hydrogen discharged from the anode 22 are combusted in the combustion section 14. The resulting combustion energy is utilized as vaporization heat (water vaporization energy) consumed in the vaporizer 15, and as reforming reaction heat (reforming reaction energy) consumed in the reformer 16. During start-up of the SOFC system 101, an unreformed raw material is combusted in the combustion section 14, to preliminarily heat an interior of the SOFC hot module 1.

A temperature of heat required in the reforming reaction in the reformer 16 is about 650 degrees C. An amount of added water required for the reforming reaction is such that S/C (steam carbon ratio:mol ratio between water and carbon in the raw material) is equal to or more than 2.0 at least, and is typically about 2.5 to 3.0. The SOFC hot module 1 is controlled so that these conditions are satisfied, and generates hydrogen-rich reformed gas from the raw material and the reforming water.

The reformed gas generated in the reformer 16 is supplied to the anode 22 of the SOFC cell 13, while the air is supplied from the blower 9 to the cathode 23. An electrochemical reaction proceeds as represented by the following formula:

$$H_2 + \tfrac{1}{2}O_2 \rightarrow H_2O \qquad (1)$$

This reaction is similar to a combustion reaction of hydrogen. A basic principle of the fuel cell is such that energy equivalent to a combustion energy resulting from this combustion reaction is taken out electrochemically. Through this reaction, electric power is generated and heat is generated. The resulting heat (power generation waste heat) resulting from the heat generation is utilized as a portion of the water vaporization energy in the vaporizer 15 and a portion of the reforming reaction energy in the reformer 16. In a case where the SOFC hot module 1 of Embodiment 1 is an anode-supported SOFC, which is a recent main stream, its cell operation temperature is about 700 degrees C.

As described above, in the SOFC hot module 1 in the SOFC system 101 according to Embodiment 1, the vaporizer 15 and the reformer 16 are actuated by utilizing the waste heat resulting from the power generation in the SOFC cell 13 and combustion heat of the surplus reformed gas. The SOFC cell 13 is actuated by the reformed gas generated by the actuated vaporizer 15 and the actuated reformer 16. In other words, in the SOFC hot module 1, a power regenerative mechanism is constructed.

The combustion exhaust gas discharged from the SOFC hot module 1 is a gas obtained after the waste heat resulting from the power generation in the SOFC cell 13 and combustion heat of the surplus reformed gas have been utilized to actuate the vaporizer 15 and the reformer 16, and contains water generated in the fuel cell and water generated in the combustion, in the form of steam. A temperature of the exhaust gas is about 250 degrees C. Because of this, this exhaust gas is utilized in heating for the ammonia absorption chiller 10.

(Raw Material (Fuel) Gas)

A raw material (fuel) gas supplied to the above stated SOFC system 101 will now be described. Typically, as the raw material (fuel) gas, LNG (liquefied natural gas) or LPG (liquefied petroleum gas) is used. Since impurities are removed automatically from these gases when these gases are liquefied, these gases become high in purity. In view of safety, these gases are added with a certain amount of an odorant and supplied. As the odorant, a sulfur compound is mainly used. However, the sulfur poisons a large portion of catalysts. In some districts, a natural gas is supplied from a gas field to the SOFC system 101 as the raw material (fuel) gas via a pipe line. In this case, the gas contains a certain amount of sulfur in addition to hydrocarbon. In addition, in a case where a nitrified gas (bio gas) is utilized as the raw material (fuel) gas, the nitrified gas contains various odiferous substances.

To prevent the catalysts from being poisoned, by, for example, the odiferous substances such as the sulfur contained in the raw material (fuel) gas as described above, it is necessary to remove the odiferous substances from the raw material (fuel) gas as much as possible before the raw material (fuel) gas is supplied to the reformer 16. To this end, the SOFC system 101 of Embodiment 1 includes the fuel processor system (FPS) 3 to remove the impurities. Note that the SOFC is high in operating temperature differently from the PEFC. Because of this, the SOFC has an advantage that it is higher in chemical resistance than the PEFC regarding an adsorbing/removing property of the impurities with respect to the catalysts. Furthermore, since the SOFC is an anion type (anions are supplied from the cathode to the anode, and react in the anode), most of low-molecular volatile impurities are combusted in the anode.

The fuel processor system (FPS) 3 includes filters for removing the impurities by water washing, adsorption, etc., to purify the raw material (fuel) gas. In particular, a desulfurization filter within the fuel processor system 3 performs desulfurization. If the raw material (fuel) gas contains a little sulfur compound, the fuel processor system (FPS) 3 may be omitted.

(Ammonia Absorption Chiller)

Next, a configuration of the ammonia absorption chiller 10 included as the heat load in the cogeneration system 100 according to Embodiment 1 will be described. As shown in FIG. 4, the ammonia absorption chiller 10 includes the regenerative heat exchanger 51, a rectification device 62, a radiator 54, an absorption device 56, and a storage container 57. As an absorbing liquid, water is used, while as a cooling medium, ammonia is used. That is, the ammonia absorption chiller 10 uses as a working fluid a mixture medium of the ammonia and the water.

An ammonia aqueous solution stored in the storage container 57 is heated and vaporized by a heat source in the regenerative heat exchanger 51. A mixture gas of the water and the ammonia is divided in the rectification device 52. The water with a high boiling point is returned to the storage container 57 and the absorption device 56 via the regenerative heat exchanger 51, while only the ammonia with a low boiling point is supplied to the radiator 54 through the rectification device 52.

The radiator 54 operates to cool and liquefy an ammonia vapor. Liquid ammonia generated by cooling the ammonia vapor in the radiator 54 to cause the ammonia vapor to radiate heat is supplied to a cooler 55 through a narrow tube. The liquid ammonia having a higher concentration inside of the cooler 55 is vaporized and absorbed into the water inside of the absorption device 56. The target (BTS 11) is cooled in such a manner that the liquid ammonia deprives vaporization latent heat from the target when the liquid ammonia is absorbed into the water inside of the absorption device 56. By executing this cycle continuously, the ammonia absorption chiller 10 can lower the temperature of the heat of the exhaust gas supplied to the regenerative heat exchanger 51 and take out cooling heat output from the ammonia absorption chiller 10.

More specifically, a COP of the ammonia absorption chiller 10 is 0.5 to 0.6. The ammonia absorption chiller 10 is able to output cooling heat of 0.5 to 0.6 with respect to the input heat 1.0. In addition, the ammonia absorption chiller 10 is able to take out cooling heat output which is substantially proportional to the input heat energy. A vapor generation temperature in a generating apparatus (not shown) in the ammonia absorption chiller 10 is about 100 degrees C. to 160 degrees C. Since the temperature of the exhaust gas discharged from the SOFC hot module 1 is about 250 degrees C., the ammonia absorption chiller 10 can be actuated.

As the vapor generation temperature is higher, a cooling attainment temperature is lower. Therefore, in the case where a flow rate of the exhaust gas discharged from the SOFC hot module 1 is equal, the cooling heat output increases as the temperature of the exhaust gas increases. As the temperature of the exhaust gas is higher, the cooling heat output from the ammonia absorption chiller 10 increases. Therefore, the apparatus can be reduced in size, by reducing a heat exchange area of the regenerative heat exchanger 51.

In view of the above stated advantages, the temperature of the exhaust gas input to the regenerative heat exchanger 51 is suitably higher.

(Configuration of BTS)

Next, the BTS 11 included as the power load in the cogeneration system 100 according to Embodiment 1 will be described.

Electric power consumption in the BTS 11 is about 800 W under a maximum load. The detail of 800 W is such that electric power consumption in a control amplifier section (not shown) which performs signal processing is 300 W, electric power consumption in the power amplifier section (not shown) which amplifies this signal and converts it into an electric wave is 300 W, and electric power consumption in an auxiliary driving source such as an air-cooling fan (not shown) is 200 W.

An amplification efficiency in the power amplifier section is improved year by year. These days, the amplification efficiency is generally about 40%. The fact that the power amplification efficiency is 40% means that the electric power of 100 W is needed to output a power amplification signal of 40 W. The remaining 60 W corresponds to generated heat. That is, the heat generated in the power element in the power amplifier section increases as the consumed energy (communication energy) relating to the communication increases. In other words, this power element ambient temperature T depends greatly on a magnitude of the communication energy.

A heat resistance temperature of general electronic components is about 70 degrees C. to 80 degrees C. The control amplifier section which consumes a little electric power need not be basically cooled, or it is sufficient that the control amplifier section is cooled by normal air-cooling using a fan irrespective of an outside air temperature (even though the outside air temperature is, for example, 50 degrees C.).

By comparison, the temperature of the power element (power-MOS-FET, etc.) for use in the power amplifier section reaches 200 degrees C. or higher due to the above stated heat generation, unless it is cooled, and exceeds a junction heat resistance temperature (170 degrees C. in the case of a Si element), so that the power element will be broken. Since the temperature of the power element resulting from the heat generation is high, it is not possible to implement sufficient cooling by the above stated air-cooling using the air-cooling fan.

Accordingly, in the cogeneration system 100 according to Embodiment 1, the ammonia absorption chiller 10 is able to cool the BTS 11 such that its operating temperature (power element ambient temperature T) is equal to or lower than 35 degrees C.

To enable the BTS 11 with maximum electric power consumption of 800 W to operate stably, a heat amount which must be forcibly removed is 60% of 300 W, i.e., heat amount corresponding to 180 W. The configuration in which an entire of the interior of the gas station shelter is cooled to 35 degrees C. or lower is inefficient. Accordingly, in the cogeneration system 100 according to Embodiment 1, the entire of the interior of the base station shelter is not cooled but a portion (power element in the power amplifier section) to be forcibly cooled is directly cooled. The power generation amount in the SOFC system 101 is controlled so that the power element ambient temperature T becomes equal to or lower than a predetermined temperature (35 degrees C. or lower).

In the case where the portion to be forcibly cooled is directly cooled, a cooling amount which is proportional to the communication energy is given, thereby enabling the base station to operate stably irrespective of the outside air temperature.

In the cogeneration system 100 according to Embodiment 1, a generated electricity-heat ratio is constant and a consumed electricity-heat ratio is constant irrespective of the outside air temperature in the base station. A value of the electricity-heat ratio is a numeric value derived by dividing the electric power consumed or generated by the heat consumed or generated. For example, in the case of an apparatus which consumes electric power of 1000 W and consumes cooling heat of 500 W, the value of the consumed electricity-heat ratio is 2. Or, in the case of an apparatus which consumes electric power of 1000 W and consumes cooling heat of 200 W, the value of the consumed electricity-heat ratio is 5.

That is, as the heat amount consumed with respect to an equal electric power is less, the value of the consumed electricity-heat ratio is greater. In the present embodiment, the generated heat amount is defined as a heat amount which is the temperature of the exhaust gas discharged from the SOFC hot module 1, i.e., after the vaporizer 15 and the reformer 16 have utilized power generation reaction heat and combustion heat of unused fuel. By comparison, the consumed heat amount is a heat amount generated in the BTS 11 after consuming the electric power in the power amplifier section.

In the cogeneration system 100 according to Embodiment 1, the power generation in the SOFC cell 13 is controlled so that the value of generated electricity-heat ratio becomes constant irrespective of the outside air temperature.

More specifically, the cogeneration system 100 is configured such that the value of the ratio between the electric power generated by the power generation in the SOFC cell 13 and the heat amount generated in conjunction with this power generation (value of generated electricity-heat ratio) is equal to or less than the value of the ratio between the electric power consumed in the power amplifier section in the BTS 11 and the heat amount generated in conjunction with this electric power consumption (value of consumed electricity-heat ratio). By controlling the power generation amount in the SOFC cell 13 according to the electric power consumption relating to the communication in the base station, the base station can be actuated stably.

As a result, the cogeneration system 100 of the present embodiment can be used as a fuel supply system for a base station provided in a region which is physically isolated and cannot another additional (auxiliary) power source, and where a weather is severe and an outside air temperature fluctuates with a passage of time, or from season to season.

(Electric Power Consumption in BTS)

Next, the electric power consumption in the above stated BTS 11 will be described. The electric power consumed in the BTS 11 depends on the communication amount as described above. When the electric power consumption is 800 W at maximum, an average power output during use is about 400 W. Therefore, it is not necessary to make a design so that the maximum power output generated in the SOFC 13 becomes always 800 W. For example, a design may be made so that the maximum power output generated in the SOFC cell 13 is 500 W which is a little higher than the average power output, and the resulting surplus electric power is stored in the SB 19 during the average power output. In addition, during the average power output, the temperature to which the power amplifier section is excessively cooled by the ammonia absorption chiller 10 is set lower than 35 degrees C.

As described above, during the average power output, the surplus electric power is stored, and the power amplifier section is cooled to a temperature lower than 35 degrees C. Thereby, when the maximum power output (800 W) is demanded, this demand is met by supplying the electric power generated in the power generation and the stored electric power. Since the power amplifier section is excessively cooled in advance to the temperature lower than 35 degrees C., the heat generated when the BTS 11 is actuated with the maximum power output can be addressed by surplus cooling heat and cooling heat obtained by cooling by the ammonia absorption chiller 10.

Therefore, it becomes possible to operate the SOFC cell 13 stably under a constant load although it is difficult to start-up and shut-down the SOFC cell 13, to decrease its power generation efficiency to a specified value or less in view of self-sustainable supply of heat, and to change a load promptly in response to a communication load of the BTS 11 fluctuating rapidly.

In the cogeneration system 100 according to Embodiment 1, the consumed electricity-heat ratio is substantially constant and the generated electricity-heat ratio is substantially constant. Because of this, instead of controlling the power generation in the SOFC cell 13 according to the electric power consumption relating to the communication in the base station, the power generation may be controlled according to the cooling heat consumption in the power element of the power amplifier section. In the case of the configuration in which the power generation is controlled by the cooling heat consumption, the cogeneration system 100 can attain required electric power supply by performing simple control in the heat-superior and power-subordinate relationship in which operation and power generation are performed according to a demand of heat, for example, a cooling medium bath temperature is kept to a specified temperature or less (e.g., 70 degrees C. or less). Thus, the cogeneration system 100 can be actuated properly by the simple control in the heat-superior and power-subordinate relationship, and reliability of the system can be improved.

(Control of Generated Electricity-Heat Ratio)

Next, control of the generated electricity-heat ratio in the cogeneration system 100 will be described, using the cogeneration system 100 of FIG. 4 as an example. As described above, the value of the generated electricity-heat ratio in the BTS 11 is 800 W (generated electric power): 180 W (generated heat amount) during the maximum power output, i.e., about 4. By providing a configuration for attaining cooling heat corresponding to the heat amount of 180 W in the generated electricity-heat ratio of 4, demand and supply of electric power and cooling heat can be balanced in the cogeneration system 100.

In a case where the cogeneration system 100 is configured such that the cooling heat of 300 W is generated with respect to the electric power of 800 W during the maximum power output, surplus cooling heat of about 100 W is provided. In this configuration, the cogeneration system 100 excessively cools the power element. However, such excess cooling does not cause any problem in the operation of the power element. On the other hand, in the case where the value of the generated electricity-heat ratio is 8, i.e., only the heat amount of 100 W can be attained with respect to the generated electric power of 800 W, the power element will be broken due to insufficient cooling ability, which is a problematic. Because of this, in the case where the power generation efficiency is the same, the heat amount obtained by unit power generation is suitably more, i.e., the generated electricity-heat ratio is suitably smaller.

As described above, the exhaust gas discharged from the SOFC hot module 1 contains the water generated through the SOFC cell reaction and the water generated by the combustion. In the cogeneration system 100 according to Embodiment 1, after the ammonia absorption chiller 10 which is a heat source has consumed specified heat amount, the exhaust gas is supplied to the total enthalpy heat exchanger 7. The temperature of the heat exchanger in the ammonia absorption chiller 10 is about 150 degrees C. The exhaust gas with a temperature of 150 degrees C. is supplied to the total enthalpy heat exchanger 7.

The total enthalpy heat exchanger 7 is supplied with the above stated exhaust gas and the fuel gas to be sent out to the SOFC hot module 1. The total enthalpy heat exchanger 7 transfers the steam contained in the exhaust gas supplied via the ammonia absorption chiller 10 to the fuel (raw material) gas using the selective permeable membrane 72 in the total enthalpy heat exchanger 7 (performs total enthalpy heat exchange). Thus, the steam contained in the exhaust gas and the heat owned by the steam are transferred to the fuel gas.

The fact that the steam contained in the exhaust gas and the heat owned by the steam are transferred to the fuel (raw material) gas by the total enthalpy heat exchanger 7 is equivalent to the fact that a portion of the reforming reaction heat (reforming vaporization energy) consumed in the reformer 16 is recovered from the exhaust gas. Because of this, the reforming reaction heat (reforming vaporization energy) consumed in the SOFC hot module 1 can be reduced while maintaining a fuel consumption ratio. As a result, the temperature of the exhaust gas discharged from the SOFC hot module 1 can be raised. Thereby, an amount of energy consumed to actuate the ammonia absorption chiller 10 provided in a subsequent stage of the SOFC hot module 1 increases. That is, the value of generated electricity-heat ratio can be reduced although the power generation efficiency is constant. Transferring the steam contained in the exhaust gas to the fuel gas means that the water is recovered and re-used. This can lead to self-sustainable supply of water in the base station located in conditions of site in which no water source is obtained.

The temperature of the exhaust gas cannot be lowered sufficiently to a level at which the steam contained in the exhaust gas can be recovered as the condensed water, when only the total enthalpy heat exchanger 7 is used. Accordingly, the cogeneration system 100 of Embodiment 1 of FIG. 4 further includes the condensation heat exchanger 8 as described above. The exhaust gas which has gone through the total enthalpy heat exchange in the total enthalpy heat exchanger 7 is supplied to the condensation heat exchanger 8, and the air to be sent out the SOFC hot module 1 is supplied to the condensation heat exchanger 8. The condensation heat exchanger 8 exchanges heat between this air and the exhaust gas, thereby preliminarily heating the air to be sent out the SOFC hot module 1.

The cogeneration system 100 of Embodiment 1 of FIG. 4 is able to send out the preliminarily heated air to the SOFC hot module 1, and reduce the vaporization heat consumed in the SOC hot module 1. This makes it possible to raise the temperature of the exhaust gas discharged from the SOFC hot module 1.

The temperature of the exhaust gas can be lowered to a temperature at which the condensed water can be generated, by the heat exchange with the air in the condensation heat exchanger 8. The condensed water derived from the exhaust gas is stored in the drain tank 2 as the reforming water. The condensed water stored in the drain tank 2 is supplied to the vaporizer 15 within the SOFC hot module 1, by an operation of a first condensed water pump 20.

In the above described manner, since the steam contained in the exhaust gas can be stored in the drain tank 2 as the reforming water and the stored condensed water can be supplied to the vaporizer 15, the self-sustainable supply of water can be achieved in the base station located in conditions of site in which no water source is obtained. The self-sustainable supply of water will be described later.

The cogeneration system 100 of Embodiment 1 of FIG. 4 is configured to supply electric power from auxiliary power sources (e.g., solar light power generation, wind power generation) other than the SOFC cell 13, to the power converter (not shown).

For example, it is supposed that the cogeneration system 100 is configured to perform control for cooling in the heat-superior and power-subordinate relationship, instead of performing control for the power generation in the SOFC cell 13 according to the electric power consumption relating to the communication. In this case, if the value of generated electricity-heat ratio is smaller, the SOFC cell 13 cannot cover all of desired electric power. In that case, it is desirable to supply the electric power from the auxiliary power source in addition to the SOFC cell 13.

Regenerative energy of the exhaust gas, or the like supplied to the ammonia absorption chiller 10 is not energy generated by consuming the fuel cell for the purpose of attaining the regenerative energy. By managing power using the SOFC cell 13 as a base load power supply and using the auxiliary power source together with the SOFC cell 13, fuel consumption can be reduced. The reduction of the fuel consumption provides an advantage in management that a frequency with which a fuel tank is changed can be reduced, for example.

Next, Modified examples (Modified example 1 to modified example 4) of the above described cogeneration system 100 of Embodiment 1 of FIG. 4 will be described.

Modified Example 1

Figure 5:
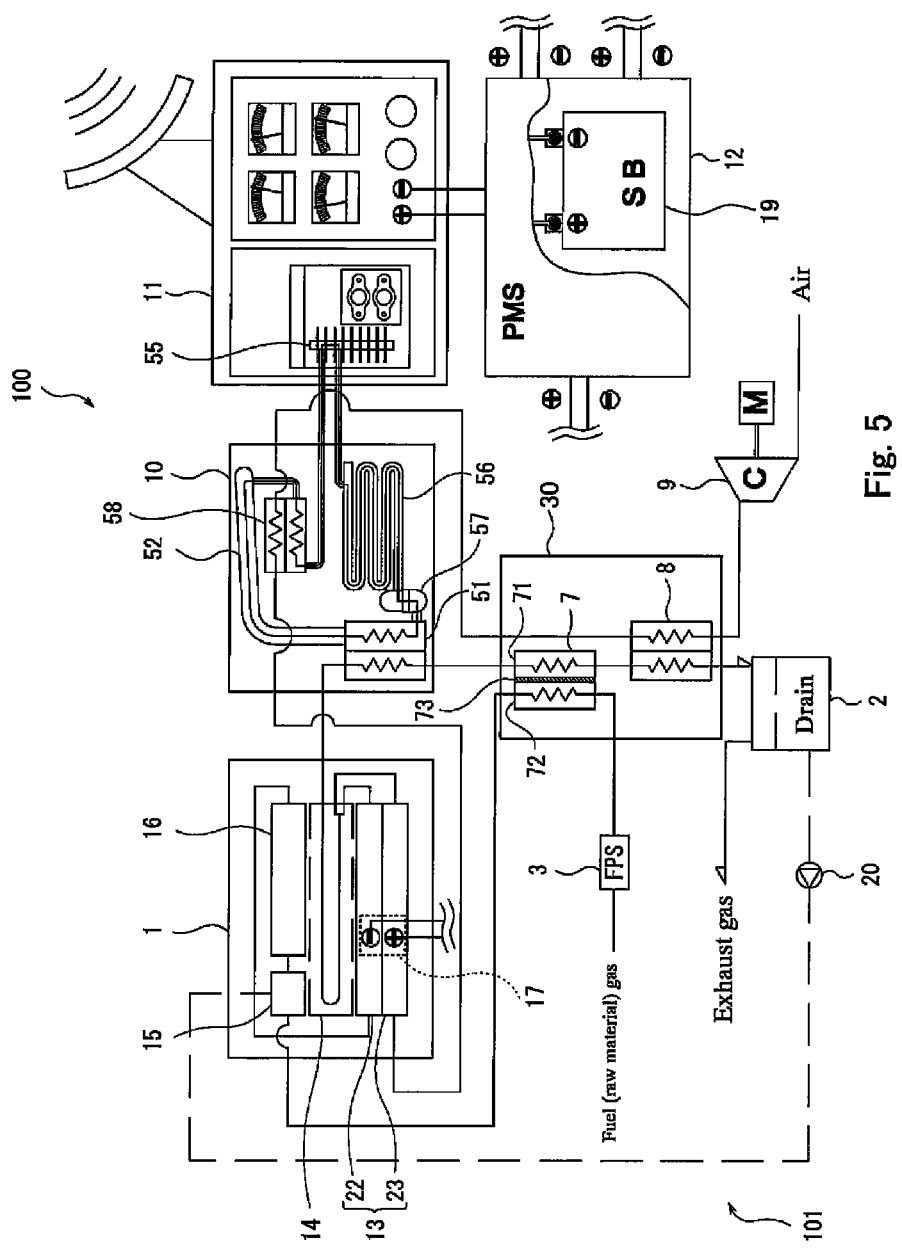
FIG. 5 is a schematic view showing an exemplary configuration of a cogeneration system according to Modified example 1 of Embodiment 1.

As shown in FIG. 4, the ammonia absorption chiller 10 in the cogeneration system 100 of Embodiment 1 is configured to cause the radiator 54 to cool the generated cooling medium vapor (vaporized ammonia) for condensation and liquefaction. Alternatively, as shown in FIG. 5, instead of the radiator 54, the ammonia absorption chiller 10 may include a cooling medium condensation heat exchanger (fourth heat exchanger) 58 which is supplied with the air to be sent out to the SOFC hot module 1 and exchanges heat between this air and the cooling medium vapor. FIG. 5 is a schematic view showing an exemplary configuration of a cogeneration system 100 according to Modified example 1 of Embodiment 1. Since the cogeneration system 100 of FIG. 5 is identical in configuration to the cogeneration system 100 of FIG. 4 except that the radiator 54 is replaced by the cooling medium condensation heat exchanger 58, the components other than the cooling medium condensation heat exchanger 58 are identified by the same reference symbols and will not be described in repetition.

In this configuration, the ammonia absorption chiller 10 is able to cool and condense the cooling medium vapor and preliminarily heat the air to be sent out to the SOFC hot module 1.

Thus, the ammonia absorption chiller 10 can operate stably and the temperature of the exhaust gas discharged from the SOFC hot module 1 can be increased. In other words, exergy of the exhaust gas can be improved. Although Modified example 1 has been described as Modified example of the cogeneration system 100 having the configuration of FIG. 4, it may be applicable to the cogeneration system 100 having the configuration of FIG. 2 or FIG. 3. That is, in the cogeneration system 100 having the configuration of FIG. 2 or FIG. 3, as shown in FIG. 5, instead of the radiator 54, the ammonia absorption chiller 10 may include the cooling medium condensation heat exchanger (fourth heat exchanger) 58 which is supplied with the air to be sent out to the SOFC hot module 1 and exchanges heat between this air and the cooling medium vapor.

Modified Example 2

Figure 6:
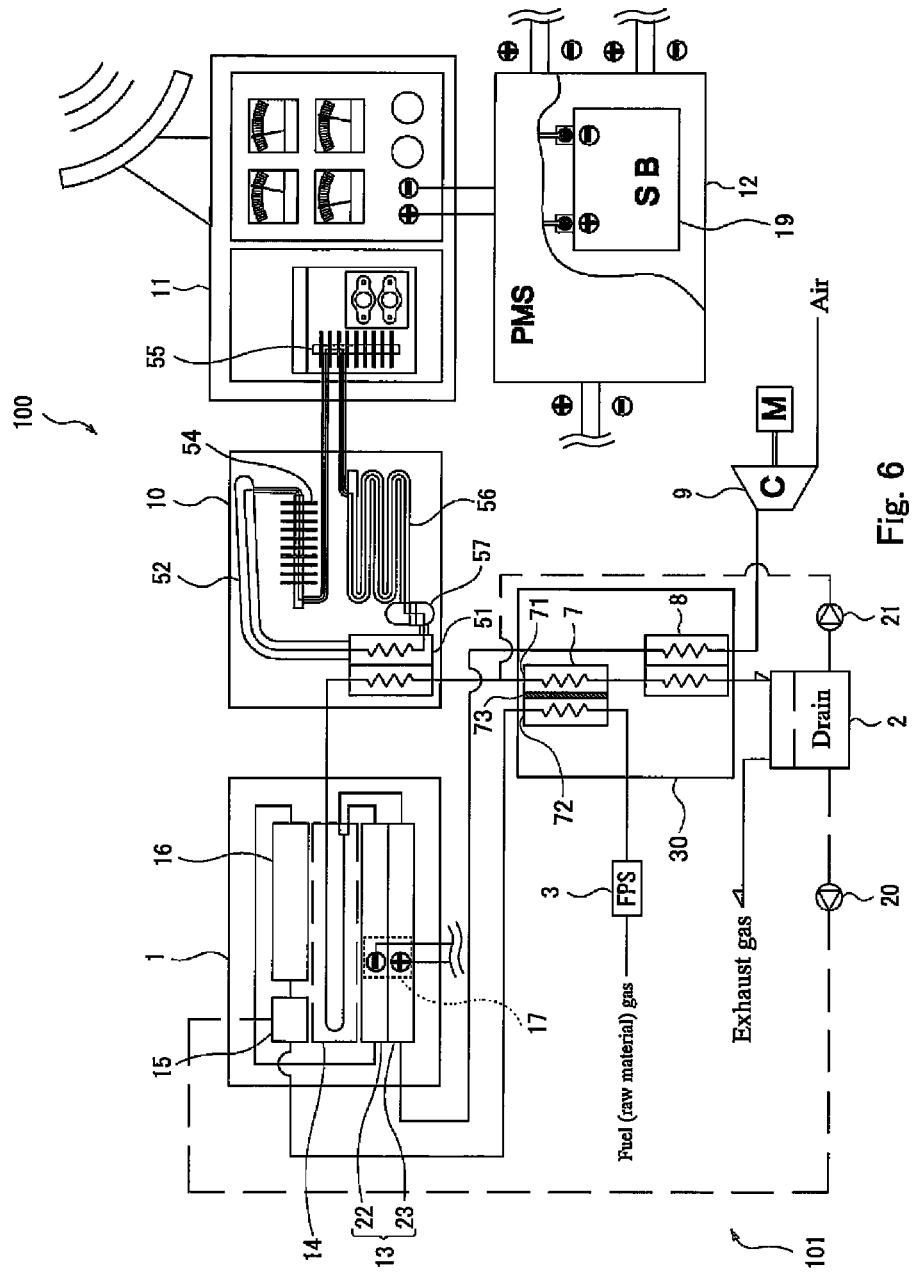
FIG. 6 is a schematic view showing an exemplary configuration of a cogeneration system according to Modified example 2 of Embodiment 1.

In the cogeneration system 100 of FIG. 4, the total enthalpy heat exchanger 7 is supplied with the fuel (raw material) gas and the exhaust gas. Alternatively, as shown in FIG. 6, in Modified example 2, the cogeneration system 100 may further comprise a second condensed water pump (water transporting unit) 21 which supplies the condensed water from the drain tank 2 to the total enthalpy heat exchanger 7. FIG. 6 is a schematic view showing an exemplary configuration of the cogeneration system 100 according to Modified example 2 of Embodiment 1. Since the cogeneration system 100 of FIG. 6 is identical in configuration to the cogeneration system 100 of FIG. 4 except that the water can be supplied from the drain tank 2 to the total enthalpy heat exchanger 7, the same components as those of the cogeneration system 100 of FIG. 4 are identified by the same reference symbols, in the cogeneration system 100 of Modified example 2, and will not be described in repetition.

Figure 7:
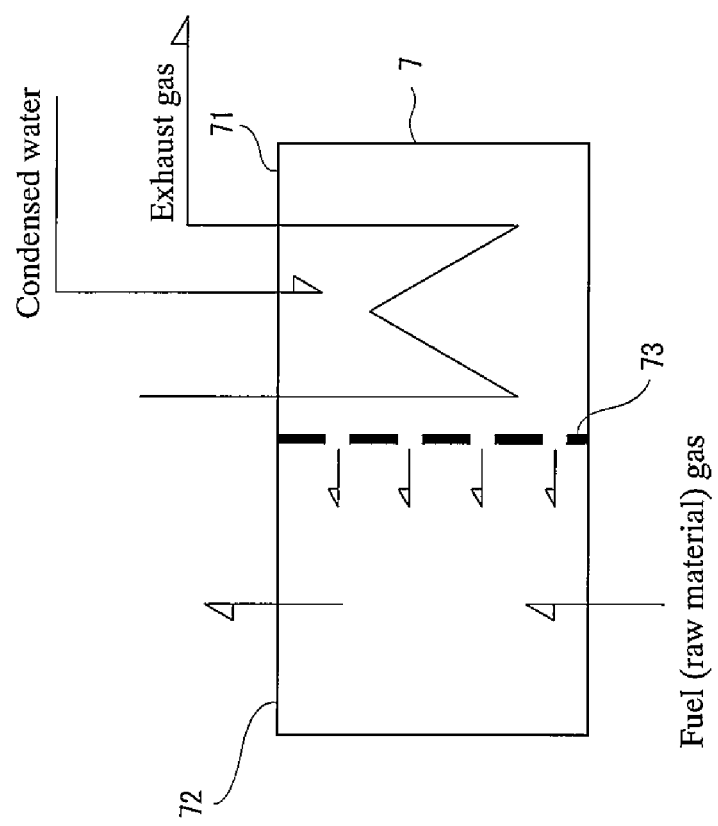
FIG. 7 is a schematic view showing an exemplary configuration of a total enthalpy heat exchanger in the cogeneration system of FIG. 6.

The total enthalpy heat exchanger 7 supplied with the fuel gas, the exhaust gas and the water from the drain tank 2 has, for example, a configuration of FIG. 7. FIG. 7 is a schematic view showing an exemplary configuration of the total enthalpy heat exchanger 7 in the cogeneration system 100 of FIG. 6.

As shown in FIG. 7, the total enthalpy heat exchanger 7 includes a fuel passage section 72 through which the fuel (raw material) gas flows and a heating section 71 through which the exhaust gas flows. In the total enthalpy heat exchanger 7, the heating section 71 and the fuel passage section 72 are separated from each other by the selective permeable membrane 73 which allows selective permeation of a moisture. In the total enthalpy heat exchanger 7, the condensed water and the exhaust gas directly contact with other and exchange heat between them (they are mixed) to generate the steam at one side of the selective permeable membrane 73, i.e., the heating section 71. The total enthalpy heat exchange between the generated steam and the fuel (raw material) gas flowing through the fuel passage section 72 proceeds via the selective permeable membrane 73. In this way, the fuel (raw material) gas is heated and humidified. The heat exchange using the direct-contact heat exchange and the total enthalpy heat exchange has advantages that the power efficiency is high and the device can be simplified and reduced in size easily.

The temperature of the exhaust gas discharged from the ammonia absorption chiller 10 is about 150 degrees C. and this exhaust gas has an energy enough to vaporize the supplied condensed water. In Modified example 2, the fuel gas can be further humidified by supplying the condensed water stored in the drain tank 2 to the total enthalpy heat exchanger 7.

The condensation heat exchanger 8 provided in a subsequent stage of the total enthalpy heat exchanger 7 exchanges heat between the steam (condensed water) mixed with the exhaust gas and the air. The condensed water is recovered and stored into the drain tank 2.

Modified Example 3

In the cogeneration system 100 according to Modified example 2, like Modified example 1, the ammonia absorption chiller 10 may include the cooling medium condensation heat exchanger 58 instead of the radiator 54.

Modified Example 4

Figure 8:
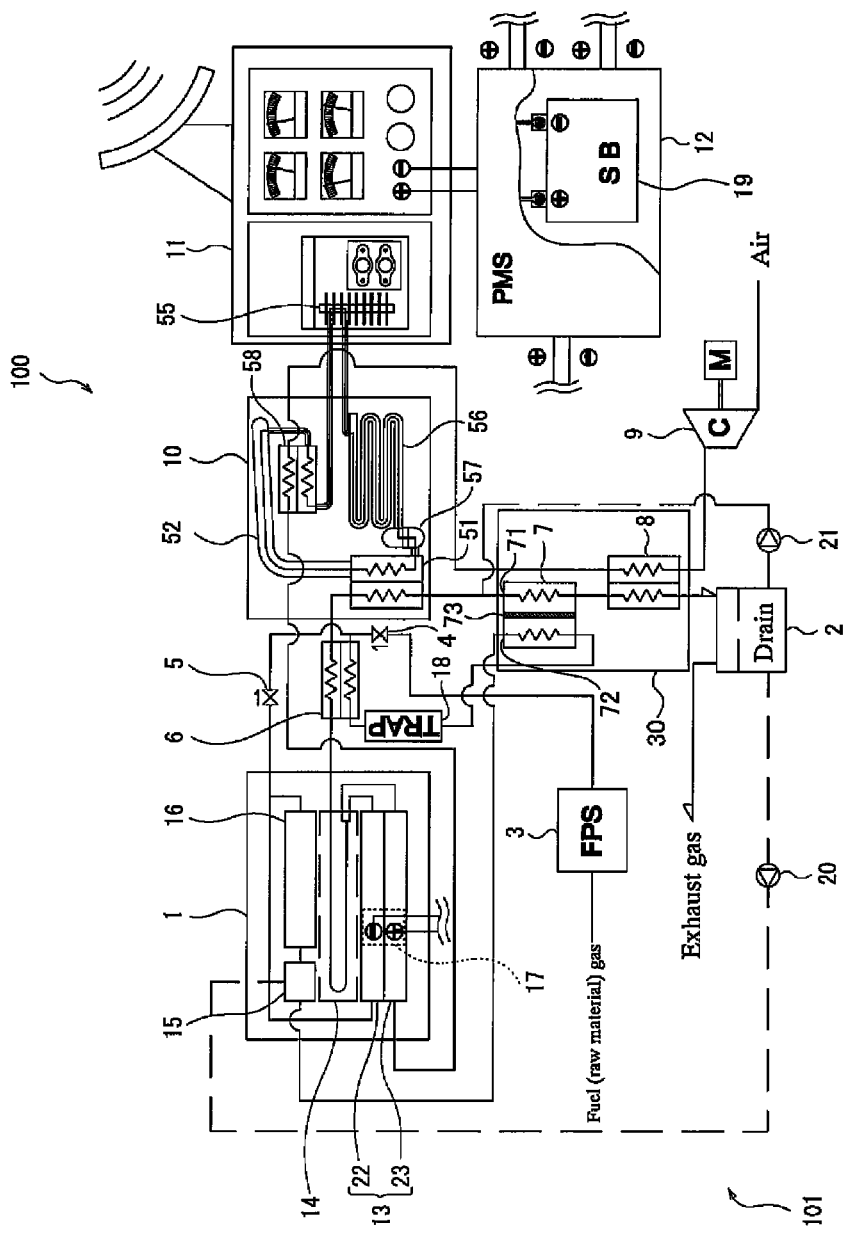
FIG. 8 is a schematic view showing an exemplary configuration of a cogeneration system according to Modified example 4 of Embodiment 1.

In Modified example 4, as shown in FIG. 8, the cogeneration system 100 may further includes in the configuration of Modified example 3, a fuel check valve 4, a reformed gas check valve 5, a hydrogenated desulfurization heat exchanger (reduction reaction section) 6, and a trap (TRAP) (adsorbing section) 18. The hydrogenated desulfurization heat exchanger 6 performs desulfurization performed in the desulfurization filter within the fuel processor system 3. FIG. 8 is a schematic view showing an exemplary configuration of the cogeneration system 100 according to Modified example 4 of Embodiment 1.

The cogeneration system 100 according to Modified example 4 is identical in configuration to the cogeneration system of Modified example 3 except that the cogeneration system 100 according to Modified example 4 further includes the fuel check valve 4, the reformed gas check valve 5, the hydrogenated desulfurization heat exchanger 6, and the trap (TRAP) 18. Therefore, the components other than the added components will not be described in repetition.

The hydrogenated desulfurization heat exchanger 6 is able to remove a sulfur compound from the fuel (raw material) gas, and exchange heat between the exhaust gas flowing through an exhaust gas side passage of the hydrogenated desulfurization heat exchanger 6 and the fuel gas flowing through a fuel gas side passage of the hydrogenated desulfurization heat exchanger 6, thereby performing the desulfurization as described below.

The hydrogenated desulfurization heat exchanger 6 performs reduction of the sulfur compound contained in the fuel (raw material) gas, by using, for example, copper zinc catalyst, to generate hydrogen sulfide. Then, the hydrogenated desulfurization heat exchanger 6 removes the generated hydrogen sulfide by using an adsorption agent such as an iron oxide.

An optimal temperature at which the fuel (raw material) gas is heated to allow this reduction reaction to proceed is about 250 degrees C. to 300 degrees C.

An internal temperature of the SOFC hot module 1 is about 650 degrees C. to 700 degrees C. The temperature of the exhaust gas discharged from the SOFC hot module 1 is about 250 degrees C. Therefore, the fuel (raw material) gas cannot be heated up to the above stated optimal temperature.

On the other hand, in the cogeneration system 100, the condensation heat exchanger 8 and cooling medium condensation heat exchanger 58 preliminarily heat the air to be supplied to the SOFC hot module 1, and the total enthalpy heat exchanger 7 heats and humidifies the fuel (raw material) gas, so that the temperature of the exhaust gas discharged from the SOFC hot module 1 can be made about 300 degrees C. Thus, the fuel can be heated up to the above stated optimal reaction temperature. Therefore, hydrogenated desulfurization can be performed with a simple configuration.

In the cogeneration system 100 according to Modified example 4, the fuel check valve 4 is provided in a passage between the fuel processor system 3 and the hydrogenated desulfurization heat exchanger 6, and the reformed gas check valve 5 is provided in a passage between the reformer 16 and the hydrogenated desulfurization heat exchanger 6. The trap (TRAP) 18 is provided in a location downstream of the hydrogenated desulfurization heat exchanger 6 and between the hydrogenated desulfurization heat exchanger 6 and the total enthalpy heat exchanger 7.

A portion of the hydrogen-rich reformed gas generated in the reformer 16 is drawn to outside of the SOFC hot module 1, and then mixed with the fuel (raw material) gas via the reformed gas check valve 5. That is, a portion of the reformed gas to be supplied to the SOFC cell 13 is divided to flow toward outside of the SOFC hot module 1 and mixed with the fuel (raw material) gas outside of the SOFC hot module 1. The fuel check valve 4 is configured to prevent a back flow of the fuel (raw material) gas.

The mixture gas is supplied to hydrogenated desulfurization heat exchanger 6 and heated up to the above stated optimal temperature by the exhaust gas flowing through the exhaust gas side passage of hydrogenated desulfurization heat exchanger 6. After the sulfur compound is subjected to the reduction reaction in the above stated catalyst, the mixture gas is discharged.

The trap (TRAP) 18 is provided in the location downstream of the hydrogenated desulfurization heat exchanger 6. The trap (TRAP) 18 adsorbs the generated hydrogen sulfide thereto. These members are located outside of the SOFC hot module 1 and maintenance of these members, for example, change can be easily carried out. Since the water impedes the reduction reaction, the reduction reaction is preferably performed before the fuel is humidified as shown in FIG. 8.

A reduction catalyst (not shown) is provided in the fuel side passage of hydrogenated desulfurization heat exchanger 6. In a case where a catalyst life is reduced in a state in which the temperature is higher than, for example, 300 degrees C., depending on the kind of a reduction reaction catalyst, the cooling medium condensation heat exchanger 58 may be omitted, but instead the radiator 54 may be provided to slightly lower the temperature of the combustion gas, off course, depending on its optimal temperature range.

The above stated plurality of heat exchangers can be combined suitably depending on restrain conditions and use environment, etc. For example, in a case where a sulfur concentration is very small and already known, adsorption desulfurization is more advantageous and the hydrogenated desulfurization heat exchanger 6 is unnecessary. In other words, all of the plurality of heat exchangers need not be provided.

In a case where it is necessary to further lower the temperature of the exhaust gas to increase the amount of recovery of the condensed water and enhance a recovery efficiency, the condensation heat exchanger 8 exchanges heat between the air and the exhaust gas and then supplies the exhaust gas to the cooler 55, which may further cool the exhaust gas. In such a configuration, the cooler 55 is required to attain a cooling heat amount required to cool the exhaust gas to a predetermined temperature in addition to at least a cooling heat amount required to cool the power amplifier section of the BTS 11. In recent BTS for base station, a power amplifier is provided with a heat pipe to radiate heat to outside so that electric power for air conditioning equipment such as an air conditioner in especially high-temperature region becomes unnecessary. In this case, the power amplifier does not require the cooling heat. Therefore, it is sufficient that the cooler 55 cools the exhaust gas to a predetermined temperature and covers a required amount of cooling heat.

(Improvement of Exergy and Self-Sustainable Supply of Water)

Next, a description will be given in more detail of an advantage that the cogeneration system 100 can raise the temperature of the exhaust gas because of provision of the heat exchangers such as the total enthalpy heat exchanger 7 and the condensation heat exchanger 8 (improvement of exergy). Specifically, this will be described in conjunction with the cogeneration system 100 of FIG. 4 as an example.

In addition, a description will be specifically given of an advantage that the cogeneration system 100 can attain the required water in a course of a running of the base station without being supplied with water from outside (self-sustainable supply of water).

As described above, the exhaust gas discharged from the SOFC hot module 1 contains as the steam the water generated through the cell reaction and the water generated by the combustion. This steam is not condensed in a generated heat exchanger temperature (about 150 degrees C.) in the ammonia absorption chiller 10, but discharged from the ammonia absorption chiller 10 in the form of the steam. As described above, this water is recovered and used to heat and humidify the fuel gas, thereby reducing the reforming water supplied to the vaporizer 15.

Here it is assumed that in a normal operating condition in the SOFC hot module 1, a power generation efficiency is 1 KW. In a case where the vaporizer 15 within the SOFC hot module 1 supplies all of the reforming water used in the reformer 16, under this condition, the temperature of the exhaust gas is about 250 degrees C. By comparison, in a case where the fuel (raw material) gas is humidified by the steam generated by vaporization in a vaporizer provided outside of the SOFC hot module 1 before it is supplied to the SOFC hot module 1, the temperature of the exhaust gas is about 450 degrees C.

Therefore, in a case where the total enthalpy heat exchanger 7 heats and humidifies a portion of the fuel (raw material) gas, like the cogeneration system 100 according to Embodiment 1 of FIG. 4, the temperature of the exhaust gas falls within a range between 250 degrees C. and 450 degrees C. That is, the temperature of the exhaust gas rises and becomes higher than 250 degrees C.

Figure 9:
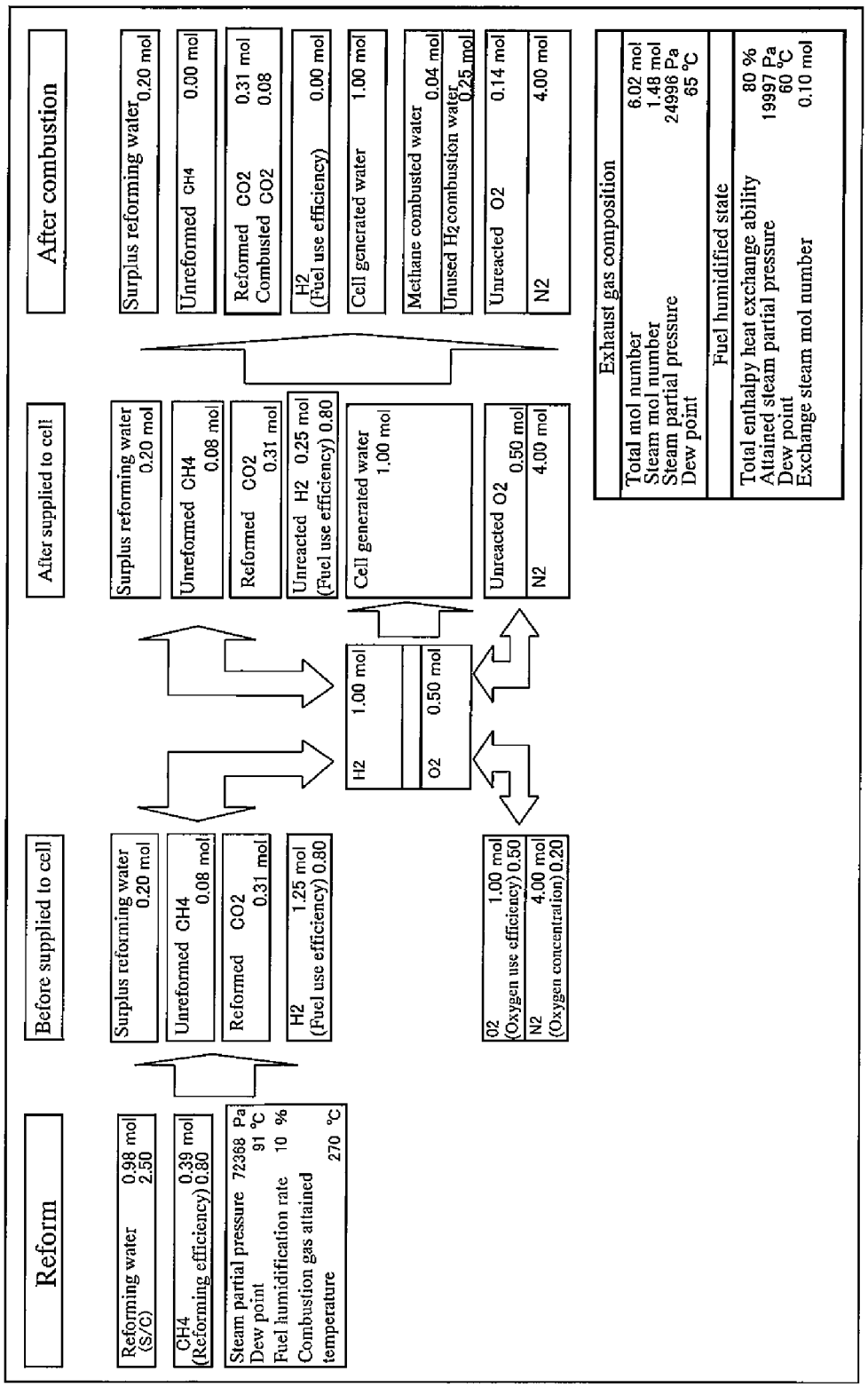
FIG. 9 is a view showing an example of supply and generation of substances in a reforming efficiency and a fuel/oxygen use (utilization) efficiency, in a cell reaction in which water of 1 mol is generated from hydrogen of 1 mol and oxygen of 0.5 mol in the cogeneration system according to Embodiment 1.

Now, a description will be given of supply and generation of substances and the attained temperature of the combustion gas in the SOFC hot module 1, in the cogeneration system 100 according to Embodiment 1, with reference to FIG. 9. It is assumed that the fuel gas supplied to the SOFC hot module 1 is a methane gas. FIG. 9 is a view showing an example of supply and generation of substances in a reforming efficiency and a fuel/oxygen use (utilization) efficiency, in a cell reaction in which water of 1 mol is generated from hydrogen of 1 mole and oxygen of 0.5 mol in the cogeneration system 100 according to Embodiment 1.

The fuel (raw material) gas and the air supplied to the SOFC hot module 1 are converted finally into an exhaust gas having a composition of carbon diode, water, nitrogen, and oxygen. A steam partial pressure in this case is about a dew point of 65 degrees C. as represented by an exhaust gas composition of FIG. 9. The exhaust gas can be humidified at a temperature of about a dew point of 60 degrees C. through the total enthalpy heat exchange (see fuel humidified state).

When a fuel use efficiency in the SOFC hot module 1 is 80%, a reforming efficiency is 80% and S/C is 2.5, reforming water of 0.98 mol is needed as shown in FIG. 9.

In this system, as represented by the exhaust gas composition, water of 1.48 mol is generated in this system. In this case, a steam partial pressure in the combustion gas composition is 24,996 Pa, and its dew point is 65 degrees C. If the water of 0.98 mol can be recovered from the steam of 1.48 mol in the exhaust gas composition, then self-sustainable supply of water is achieved.

The total enthalpy heat exchanger 7 performs the total enthalpy heat exchange to supply to the fuel (raw material) gas, water about 0.1 mol corresponding to 10% of the water 0.98 mol which is necessary for the reforming. Due to saving of vaporization heat of this, the temperature (waste heat temperature) of the exhaust gas is raised by 10% of 200 degrees C. which is a difference between 450 degrees C. and 250 degrees C., i.e., about 20 degrees C.

Figure 10:
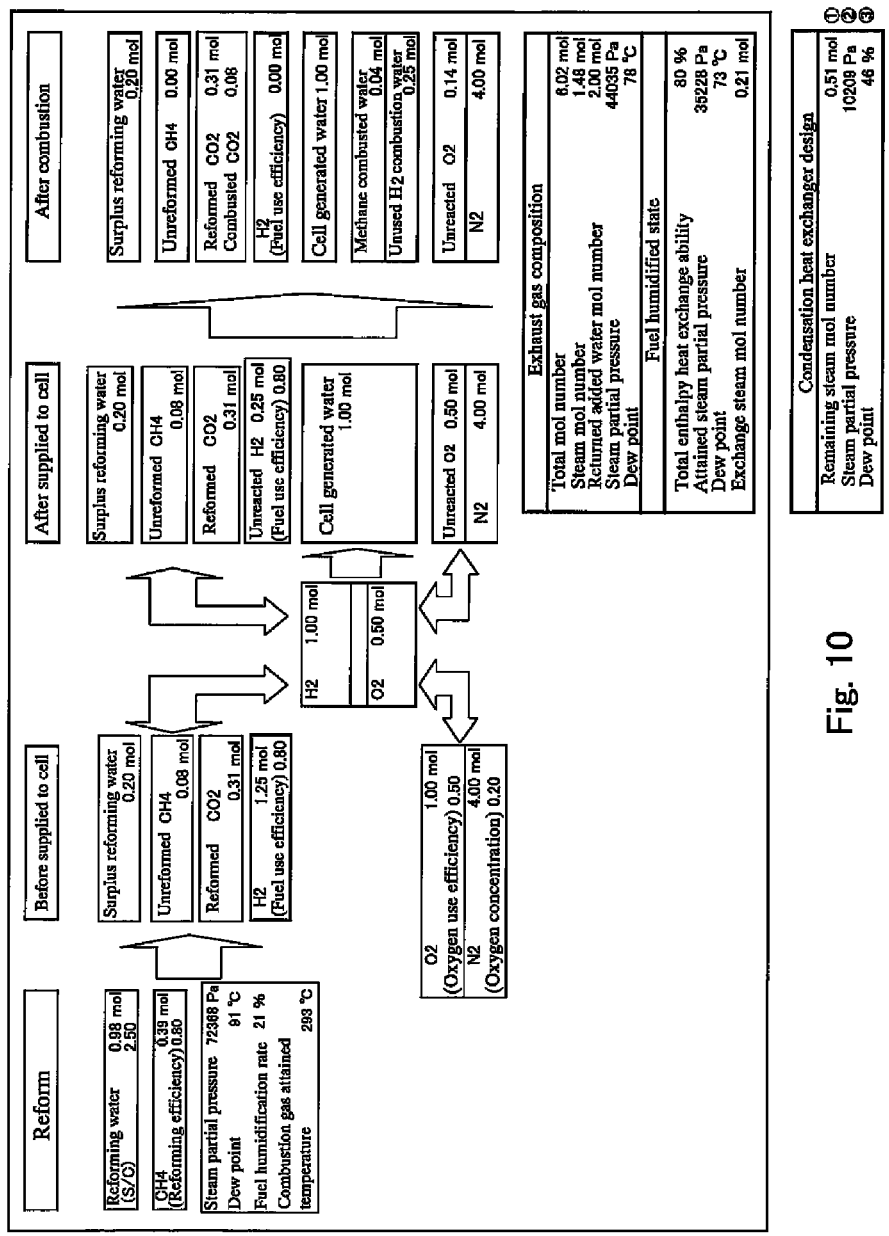
FIG. 10 is a view showing an example of supply and generation of substances in the reforming efficiency and the fuel/oxygen use efficiency, in the cell reaction in which water of 1 mol is generated from hydrogen of 1 mol and oxygen of 0.5 mol in the cogeneration system according to Embodiment 1.

The exhaust gas of about 150 degrees C. which is discharged from the ammonia absorption chiller 10 has an energy for vaporizing the water with the above stated amount or more. As described in Modified example 2 to Modified example 4, the condensed water stored in the drain tank 2 is supplied to the total enthalpy heat exchanger 7, and thereby the fuel (raw material) gas can be further humidified. FIG. 10 shows supply and generation of the substances in the cogeneration system 100 and the attained temperature of the combustion gas in the SOFC hot module 1, in this case. FIG. 10 is a view showing an example of supply and generation of the substances in a reforming efficiency and a fuel/oxygen use efficiency, in a cell reaction in which water of 1 mol is generated from hydrogen of 1 mol and oxygen of 0.5 mol in the cogeneration system 100 according to Embodiment 1.

As shown FIG. 10, the condensed water stored in the drain tank 2 is supplied to the total enthalpy heat exchanger 7, which performs the total enthalpy heat exchange to supply to the fuel (raw material) gas, water about 0.21 mol. That is, this humidification of the fuel (raw material) gas covers about 20% of the amount of the water required for the reforming in the reformer 16, thereby resulting in a temperature of the exhaust gas which is close to 300 degrees C.

As indicated by the fuel humidified state of FIG. 10, the dew point is substantially equal to the temperature of the exhaust gas discharged from the total enthalpy heat exchanger 7. The condensation heat exchanger 8 exchanges heat between this exhaust gas and the air supplied to the SOFC hot module 1, and supplies the pre-heated air to inside of the SOFC hot module 1. This makes it possible to further raise the temperature of the exhaust gas discharged from the SOFC hot module 1.

A temperature increase of the exhaust gas which is attained as described above is about 20 degrees C. in the case where attained air temperature is 70 degrees C. (room temperature+50 degrees C.). Therefore, by combining the total enthalpy heat exchange performed by the total enthalpy heat exchanger 7 and the heat exchange performed by the condensation heat exchanger 8 and by providing the cooling medium condensation heat exchanger 58 like Modified example 1, the temperature of the exhaust gas discharged from the SOFC hot module 1 exceeds 300 degrees C.

Therefore, in a case where the cogeneration system 100 has the configuration according to Modified example 4, the hydrogenated desulfurization heat exchanger 6 can heat the fuel gas up to the above stated optimal reaction temperature, and thus hydrogenated desulfurization can be performed with a simple configuration. In addition, since the temperature of the exhaust gas can be raised to become higher than 300 degrees C., even the exhaust gas which has gone through the heat exchange in the hydrogenated desulfurization heat exchanger 6 can keep exergy enough to actuate the ammonia absorption chiller 10.

In the case where the condensed water is supplied from the drain tank 2 to the total enthalpy heat exchanger 7 like the configuration of Modified example 2 to Modified example 4, the condensation heat exchanger 8 can recover the condensed water remaining after the total enthalpy heat exchanger 7 has heated and humidified the fuel gas. Thus, the water required in the vaporizer 15 can be covered.

Now, conditions for achieving self-sustainable supply of water will be discussed with reference to an example of the supply and generation of the substances in the reforming efficiency and the fuel/oxygen use efficiency, in the cell reaction in which water of 1 mol is generated from hydrogen of 1 mol and oxygen of 0.5 mol in the cogeneration system 100, shown in FIG. 10.

As shown in FIG. 10, the reforming water required in the reforming reaction is 0.98 mol. The steam in the exhaust gas composition is 1.48 mol. Therefore, if the water of 0.98 mol, of the water of 1.48 mol in the exhaust gas, can be recovered from the exhaust gas, this can cover the reforming water. That is, in this case, the water discarded to outside the system must be equal to or less than (1.48 mol−0.98 mol=0.51 mol).

In this case, the steam partial pressure must be equal to or less than 10209 Pa as described above. Since the water which has been recovered from a total mol number of 6.02 mol of the discharged exhaust gas and flows toward the reformer 16 is 0.98 mol, the steam partial pressure output from the condensation heat exchanger 8 must be equal to or less than 101300 (Pa: total pressure)*(0.51/(6.02−0.51))=10209 Pa. This is converted into a dew point of 46 degrees C. Unless the exhaust gas is cooled to 46 degrees C. or less, the water required to operate the base station is not attained. In other words, the self-sustainable supply of water in the base station is not achieved.

In view of this, in the cogeneration system 100 according to Embodiment 1 of FIG. 4, the exhaust gas is used to actuate the ammonia absorption chiller 10 in a first stage as described above. Then, the total enthalpy heat exchanger 7 transfers rough heat from the exhaust gas which has been used in the ammonia absorption chiller 10 and has been lowered in temperature, to the fuel (raw material) gas. Finally, the condensation heat exchanger 8 exchanges heat between the exhaust gas and the air, thus enabling the exhaust gas to be finally lowered to a temperature at which self-sustainable supply of water is achieved.

As described above, the cogeneration system 100 according to Embodiment 1 of FIG. 4 includes the plurality of heat exchangers (total enthalpy heat exchanger 7, condensation heat exchanger 8, and cooling medium condensation heat exchanger 58), and can enhance the exergy of the exhaust gas.

In addition to the above stated plurality of heat exchangers, the cogeneration system 100 includes the regenerative heat exchanger 51. The regenerative heat exchanger 51 is heated by the exhaust gas to actuate the ammonia absorption chiller 10. Also, in some cases, the cogeneration system 100 includes the hydrogenated desulfurization heat exchanger 6, which is heated by the exhaust gas to remove the sulfur compound from the fuel (raw material) gas. As a result, the exhaust gas can be finally lowered to 46 degree C. or less at which self-sustainable supply of water is achieved.

Therefore, in the cogeneration system 100, the SOFC system 101 serves as a base power supply, and an overall efficiency can be enhanced and self-sustainable supply of water can be achieved, by cogeneration using the SOFC system 101 and the ammonia absorption chiller 10. Because of this, even when the base station is located in a region where there is no water source and the GRID is not installed, its management can be made easier and a higher yieldability is attained.

Embodiment 2

In Embodiment 1, a description has been given of the cogeneration system 100 including the SOFC system 101 which serves as the power generating apparatus, the BTS (equipment) 11 which is located within the base station shelter and utilizes the electric power generated in the SOFC system 101, and the ammonia absorption chiller (cooling apparatus, absorption cooling apparatus) 10 for cooling the power element of the power amplifier section in the BTS 11.

Figure 11:
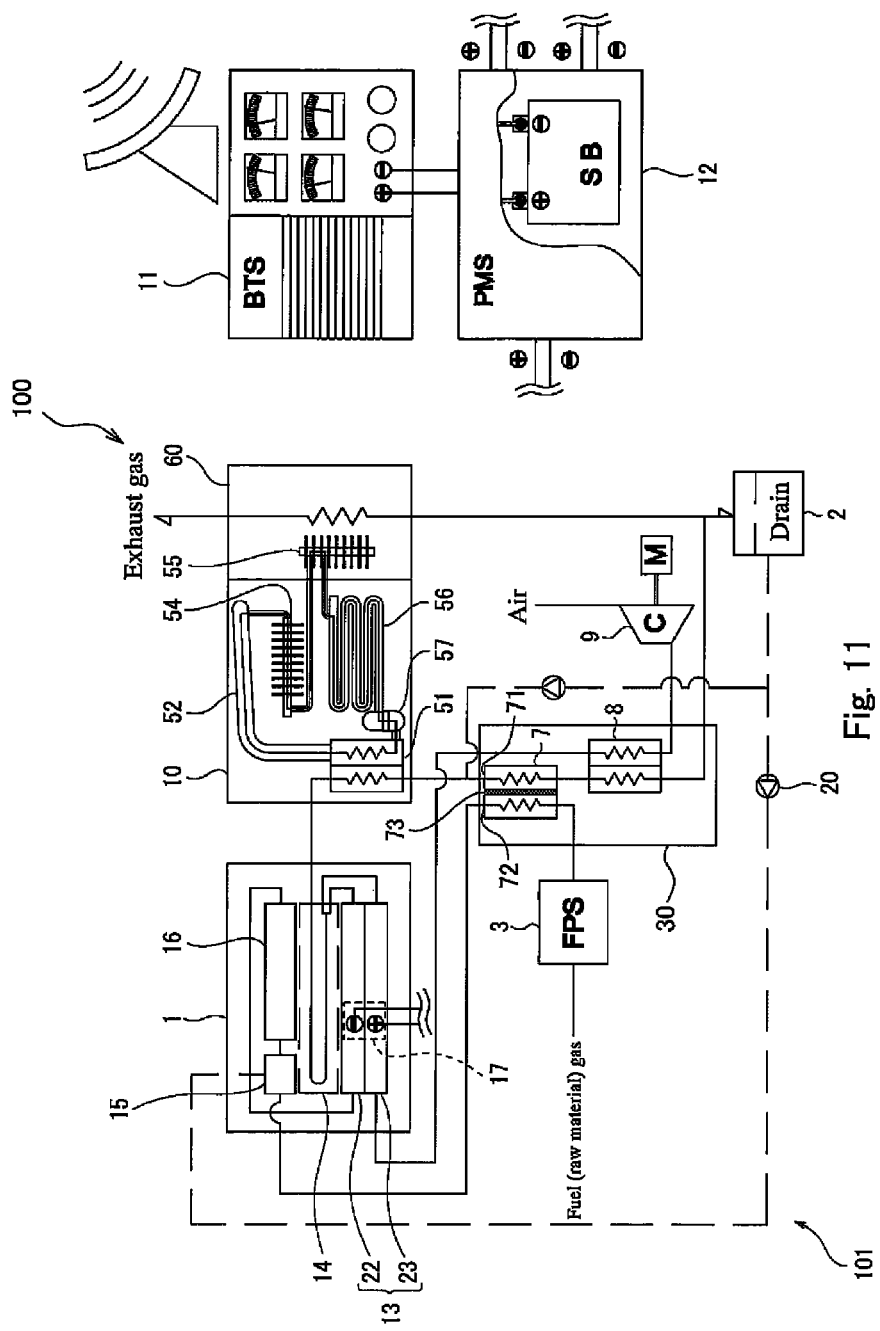
FIG. 11 is a schematic view showing an exemplary configuration of a cogeneration system according to another embodiment (Embodiment 2).

In Embodiment 2, a description will be given of the cogeneration system 100 in a case where cooling of the BTS 11 is unnecessary, with reference to FIG. 11. FIG. 11 is a schematic view showing an exemplary configuration of the cogeneration system 100 according to another embodiment (Embodiment 2). In the SOFC system 101 according to Embodiment 2, the condensation unit 30 is configured as the condensation unit 30 of FIG. 4. However, the present invention is not limited to this. For example, the condensation unit 30 in the SOFC system 101 according to Embodiment 2 may be configured as shown in FIGS. 1 to 3.

The cogeneration system 100 according to Embodiment 2 is configured in such a manner that the ammonia absorption chiller 10 cools the exhaust gas to generate the condensed water instead of cooling the power amplifier section of the BTS 11. That is, a target cooled by the ammonia absorption chiller 10 is the exhaust gas, from which the condensed water has been recovered by cooling in the condensation unit 30. In the cogeneration system 100 according to Embodiment 2, the same components as those of the cogeneration system 100 according to Embodiment 1 are identified by the same reference symbols and will not be described in repetition.

The cogeneration system 100 according to Embodiment 2 is different from the cogeneration system 100 according to Embodiment 1 (especially, Modified example 2 of FIG. 6) in that the ammonia absorption chiller 10 cools the exhaust gas discharged from the condensation heat exchanger 8 instead of cooling the BTS 11.

In the cogeneration system 100 according to Embodiment 2, like the cogeneration system 100 according to Embodiment 1, the heat owned by the exhaust gas discharged from the SOFC hot module 1 is utilized to actuate the ammonia absorption chiller 10. That is, the ammonia absorption chiller 10 consumes a portion of the heat owned by the exhaust gas, thereby cooling the exhaust gas discharged from the SOFC hot module 1. The total enthalpy heat exchanger 7 performs the total enthalpy heat exchange between the exhaust gas from which a certain amount of heat has been consumed and the fuel (raw material) gas to be supplied to the SOFC hot module 1. Furthermore, the condensation heat exchanger 8 exchanges heat between the exhaust gas after the total enthalpy heat exchange and the air to be supplied to the SOFC hot module 1. Through this heat exchange, the condensed water is generated from the exhaust gas, and the generated condensed water is stored in the drain tank 2. Furthermore, to obtain the condensed water from the exhaust gas, the exhaust gas which has gone through the heat exchange in the condensation heat exchanger 8 is supplied to the cooling section 60 of the ammonia absorption chiller 10. The cooling section 60 further cools the exhaust gas. Thus, the cogeneration system 100 according to Embodiment 2 is able to increase an amount of the condensed water generated from the exhaust gas.

Figure 12:
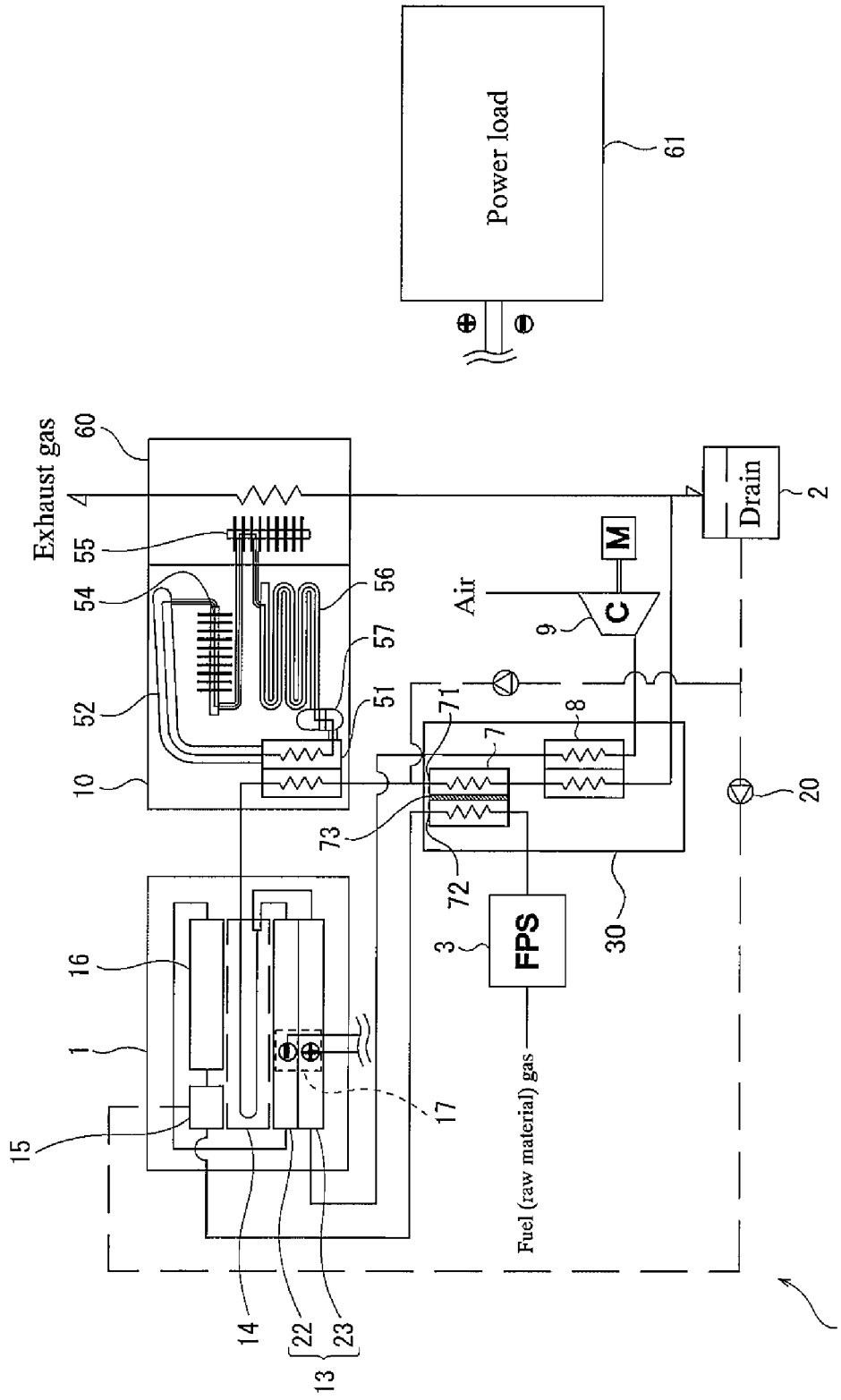
FIG. 12 is a schematic view showing an exemplary configuration of the cogeneration system according to another embodiment (Embodiment 2).

In the cogeneration system 100 according to Embodiment 2, an object which consumes the electric power generated in the SOFC system 101 is not limited to the base station (BTS 11 within the base station shelter), but may be a general power load 61 as shown in FIG. 12. FIG. 12 is a schematic view showing an exemplary configuration of a cogeneration system according to another embodiment (Embodiment 2).

Although in the present embodiment, the SOFC has been exemplarily described as the power generating apparatus, the present invention is not limited to this. For example, the power generating apparatus may be a molten carbonate fuel cell (MCFC). That is, the power generating apparatus may be a high-temperature operative fuel cell which is operative at a high temperature of, for example, 400 degrees C. or higher and attains a high-temperature exhaust gas.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

A cogeneration system 100 of the present invention is capable of efficiently forcibly cooling a component which requires cooling and achieving self-sustainable supply of water within the system. Therefore, the cogeneration system 100 is useful as a power supply which actuates equipment which includes a component which requires cooling and is located in a region which is not supplied with water easily from outside.

The equipment which is a combination of a component which requires forcible cooling and a component which does not require the forcible cooling is not limited to the above described BTS. For example, the equipment may be general electric power consumption equipment, such as a server, a data center, ship, or communication equipment for broadcast station. Therefore, the cogeneration system of the present invention is applicable to these electric power equipment.

REFERENCE SINGS LISTS

1 SOFC hot module
2 drain tank
3 fuel processor system
4 fuel check valve
5 reformed gas check valve
6 hydrogenated desulfurization heat exchanger
7 total enthalpy heat exchanger
8 condensation heat exchanger
9 blower
10 ammonia absorption chiller
11 BTS
12 power management system (PMS)
13 SOFC cell
14 combustion section
15 vaporizer
16 reformer
17 current collecting member
18 trap
20 first condensed water pump
21 second condensed water pump
22 anode
23 cathode
51 regenerative heat exchanger
52 rectification device
54 radiator
55 cooler
56 absorption device
57 storage container
58 cooling medium condensation heat exchanger
60 cooling section
61 power load
71 heating section
72 raw material passage section
72 fuel passage section
73 selective permeable membrane
100 cogeneration system
101 SOFC system
200 base station shelter
201 GRID
202 diesel generating apparatus
211 BTS
212 air conditioner
213 power management system (PMS)

The invention claimed is:

1. A cogeneration system comprising:
a high-temperature operative fuel cell configured to generate electric power through a power generation reaction by using a fuel supplied to the fuel cell and air supplied to the fuel cell;
a combustor configured to combust unconsumed fuel from the high-temperature operative fuel cell and to generate combustion heat;
a reformer configured to generate a reformed gas which becomes the fuel, through a reforming reaction between a raw material gas supplied to the reformer and a steam supplied to the reformer, by utilizing power generation reaction heat generated in the high-temperature operative fuel cell and the combustion heat generated by the combustor;
a vaporizer configured to generate the steam to be added to the raw material gas supplied to the reformer by utilizing the power generation reaction heat and the combustion heat;
a cooling apparatus configured to cool a target by consuming a portion of the power generation reaction heat and a portion of heat of an exhaust gas having the combustion heat which remain after the reformer and the vaporizer have consumed the heat, and cool the exhaust gas by consuming a portion of the heat; and
a condensation unit configured to cool the exhaust gas after the cooling apparatus has consumed the portion of the heat owned by the exhaust gas to condense a moisture contained in the exhaust gas to generate condensed water, wherein:
the condensation unit includes:
a first heat exchanger configured to heat the raw material gas to be supplied to the vaporizer by utilizing heat of the exhaust gas after the cooling apparatus has consumed the portion of the heat; and
a second heat exchanger configured to heat the air to be supplied to the high-temperature operative fuel cell by utilizing the heat of the exhaust gas after the first heat exchanger has utilized the heat and to condense the moisture contained in the exhaust gas to generate the condensed water, the cogeneration system further comprises a water transporting unit configured to transport the condensed water generated from the exhaust gas by the second heat exchanger, to the first heat exchanger, the condensed water transported by the water transporting unit is mixed with the exhaust gas to generate the exhaust gas containing the condensed water as the steam, and the first heat exchanger causes the steam contained in the exhaust gas to be transferred to the raw material gas to heat and humidify the raw material gas.

2. The cogeneration system according to claim 1, wherein the first heat exchanger is a total enthalpy heat exchanger which heats the raw material gas to be supplied to the vaporizer by utilizing the heat of the exhaust gas after the cooling apparatus has consumed a portion of the heat and humidifies the raw material gas by the moisture contained in the exhaust gas.

3. The cogeneration system according to claim 1, wherein the condensation unit includes a blower for air-cooling the exhaust gas after the cooling apparatus has consumed a portion of the heat; and wherein the blower cools the exhaust gas to condense the moisture contained in the exhaust gas to generate the condensed water.

4. The cogeneration system according to claim 1, wherein the vaporizer is configured to vaporize the condensed water by utilizing the power generation reaction heat and the combustion heat to generate the steam.

5. The cogeneration system according to claim 1, wherein the cooling apparatus is an absorption cooling apparatus which causes a cooling medium to be absorbed into an absorbing liquid and circulates the absorbing liquid, wherein the cooling medium has a lower boiling temperature than the absorbing liquid, the cogeneration system comprising:
a third heat exchanger configured to exchange heat between the exhaust gas and the absorbing liquid containing the cooling medium to separate the cooling medium from the absorbing liquid containing the cooling medium, and wherein the absorbing liquid containing the cooling medium is vaporized by heat attained by the heat exchange performed by the third heat exchanger.

6. The cogeneration system according to claim 5, wherein the absorption cooling apparatus includes:
a rectification device configured to liquefy only the absorbing liquid from the absorbing liquid having been vaporized and containing the cooling medium, to separate the absorbing liquid from the cooling medium; and a fourth heat exchanger configured to exchange heat between vaporized cooling medium which has been separated from the absorbing liquid by the rectification device and the air to be supplied to the high-temperature operative fuel cell to liquefy the vaporized cooling medium, and wherein the air heated by the heat exchange with the vaporized cooling medium which is performed by the fourth heat exchanger is supplied to the high-temperature operative fuel cell.

7. The cogeneration system according to claim 1, further comprising:
a reduction reaction section configured to reduce a sulfur compound contained in the raw material gas from a mixture gas containing a portion of the reformed gas generated by the reformer and the raw material gas, to generate hydrogen sulfide; and an adsorption section which adsorbs and removes the hydrogen sulfide generated by the reduction reaction section, wherein the reduction reaction section is supplied with the exhaust gas to be supplied to the cooling apparatus, and a reaction temperature in the reduction reaction section is maintained by the heat transferred from the exhaust gas.

8. The cogeneration system according to claim 1, further comprising:
a storage device configured to store the electric power generated in the high-temperature operative fuel cell.

9. The cogeneration system according to claim 1, wherein the cooling apparatus cools at least a component which requires cooling as the target, in equipment actuated by the electric power generated in the high-temperature operative fuel cell.

10. The cogeneration system according to claim 9, wherein an upper limit value of a temperature to which the component which requires cooling is cooled is predetermined; and wherein the cooling apparatus cools the component which requires cooling to a temperature lower than the predetermined upper limit value.

11. The cogeneration system according to claim 9, wherein the cogeneration system is configured to control an amount of power generation in the high-temperature operative fuel cell based on temperature information of the component which requires cooling.

12. The cogeneration system according to claim 1, wherein:
the cogeneration system further comprises a gas channel through which the exhaust gas having been cooled by the condensation unit flows, as the target, and the cooling apparatus includes an exhaust gas cooling portion for cooling the exhaust gas flowing through the gas channel to condense the moisture contained in the exhaust gas to generate the condensed water.

13. The cogeneration system according to claim 1, further comprising:
an exhaust gas channel through which the exhaust gas from the combustor flows and passes the cooling apparatus, the first heat exchanger and the second heat exchanger in this order.

14. The cogeneration system according to claim 1, wherein the water transporting unit includes a water channel through which the condensed water generated from the exhaust gas by the second heat exchanger flows to the first heat exchanger.

* * * * *